US008112422B2

(12) United States Patent
Srivastava et al.

(10) Patent No.: US 8,112,422 B2
(45) Date of Patent: Feb. 7, 2012

(54) COMPUTER SYSTEMS, METHODS AND COMPUTER PROGRAM PRODUCTS FOR DATA ANONYMIZATION FOR AGGREGATE QUERY ANSWERING

(75) Inventors: Divesh Srivastava, Summit, NJ (US); Cecilia Magdalena Procopiuc, Summit, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 540 days.

(21) Appl. No.: 12/258,919

(22) Filed: Oct. 27, 2008

(65) Prior Publication Data

US 2010/0114920 A1 May 6, 2010

(51) Int. Cl.
*G06F 7/00* (2006.01)
(52) U.S. Cl. ........................................ 707/737; 707/752
(58) Field of Classification Search .................. 707/694, 707/737, 752
See application file for complete search history.

(56) References Cited

U.S. PATENT DOCUMENTS

2002/0169793 A1* 11/2002 Sweeney ........................ 707/204
2009/0303237 A1* 12/2009 Liu et al. ........................ 345/440

OTHER PUBLICATIONS

Agarwal et al., "*Approximating Extent Measures of Points*", J. ACM, 51(4): 606-633 (2004).
Adam et al., "*Security Control Methods for Statistical Databases: A Comparative Study*", ACM Computing Surveys, 21(4) (Dec. 1989).
Bayardo et al., "*Data Privacy Through Optimal k-Anonymization*", IEEE International Conference on Data Engineering, Tokyo, Japan (Apr. 2005).
Doddi et al., "*Approximation Alogrithms for Clustering to Minimize the Sum of Diameters[1]*", Nordic Journal of Computing, 7(3):185-203 (2000).
Frederickson et al., "*Generalized Selection and Ranking: Sorted Matrices\**", SIAM Journal of Computing, 13(1):14-30 (Feb. 1984).
Ge et al., "*Constraint-Driven Clustering*", ACM SIGKDD (2007).
Glozman et al., "*On some geometric selection and optimization problems via sorted matrices*", Intl. Workshop on Algorithms and Data Structures, Springer-Verlag, pp. 26-37 (1995).
Li et al., "*-Closeness: Privacy Beyond -Anonymity and l-Diversity*", IEEE Intl. Conf. on Data Engineering, Atlanta, Georgia (Apr. 2006).
Machanavajjhala et al., "*l-Diversity: Privacy Beyond k-Anonymity*", IEEE Intl. Conf. on Data Engineering, Atlanta, Georgia (2006).
Megiddo et al., "*On The Complexity of Some Common Geometric Location Problems\**", SIAM Journal of Computing, 13(1): 182-196 (Feb. 1984).
Procopiuc et al., "*Efficient Table Anonymization for Aggregate Query Answering(full version)*", www.research.att.com/magda/papers/anonymity.pdf, AT&T Labs Research, Florham Park, NJ—USA.
Sweeney, "*Guaranteeing Anonymity when Sharing Medical Data, the Datafly System*", Journal of the American Medical Informatics Association, pp. 51-55 (1997).

(Continued)

*Primary Examiner* — Amy Ng
(74) *Attorney, Agent, or Firm* — Myers Bigel Sibley & Sajovec, P.A.

(57) ABSTRACT

Computer program products are provided for anonymizing a database that includes tuples. A respective tuple includes at least one quasi-identifier and sensitive attributes associated with the quasi-identifier. These computer program products include computer readable program code that is configured to (k,e)-anonymize the tuples over a number k of different values in a range e of values, while preserving coupling at least two of the sensitive attributes to one another in the sets of attributes that are anonymized to provide a (k,e)-anonymized database. Related computer systems and methods are also provided.

5 Claims, 10 Drawing Sheets

OTHER PUBLICATIONS

Xiao et al., "*Anatomy: Simple and Effective Privacy Preservation*", Intl. Conf. on Very Large Data Bases, Seoul, Korea (Sep. 2006).

Zhang et al., "*Aggregate Query Answering on Anonymized Tables*", IEEE Intl. Conf. on Data Engineering (2007).

* cited by examiner

| | Quasi-identifiers | | Sensitive | |
|---|---|---|---|---|
| tuple ID | age | zipcode | salary | bonus |
| 1 | 35 | 27101 | $54,000 | $5,320 |
| 2 | 38 | 27120 | $55,000 | $6,500 |
| 3 | 40 | 27130 | $56,000 | $7,720 |
| 4 | 41 | 27229 | $65,000 | $6,500 |
| 5 | 43 | 27269 | $75,000 | $7,500 |
| 6 | 47 | 27243 | $70,000 | $7,000 |
| 7 | 52 | 27656 | $80,000 | $7,400 |
| 8 | 53 | 27686 | $75,000 | $10,000 |
| 9 | 58 | 27635 | $85,000 | $9,500 |

| | | Quasi-identifiers | | Sensitive | |
|---|---|---|---|---|---|
| group ID | tuple ID | age | zipcode | salary | bonus |
| 1 | 1 | 40 | 27130 | $54,000 | $5,320 |
| 1 | 2 | 38 | 27120 | $55,000 | $6,500 |
| 1 | 3 | 35 | 27101 | $56,000 | $7,720 |
| 2 | 4 | 41 | 27229 | $65,000 | $6,500 |
| 2 | 5 | 43 | 27269 | $70,000 | $7,000 |
| 2 | 6 | 47 | 27243 | $75,000 | $7,500 |
| 3 | 7 | 52 | 27656 | $75,000 | $10,000 |
| 3 | 8 | 53 | 27686 | $80,000 | $7,400 |
| 3 | 9 | 58 | 27635 | $85,000 | $9,500 |

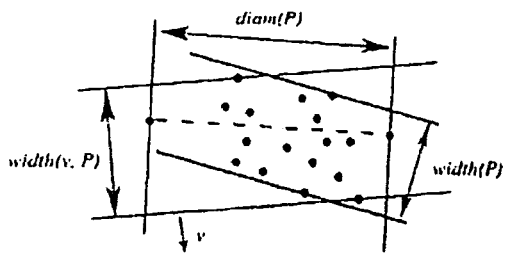

FIG. 7

```
GREEDYSUM(P)
   P = {p_1,...,p_n}: sorted in increasing order;
   I_c = [I_c.l, I_c.r]: current interval;
1. C = {}; I_c = I(p_1);
2. for i = 2 to n
3.    if (p_i ∈ I_c)
4.       continue;
5.    If (p_i − p_{i−1} < length(I(p_i)))
6.       I_c.r = p_i;  /*extend I_c to cover p_i*/
7.    else
8.       C = C ∪ {I_c};
9.       I_c = I(p_i); /*canonical interval of p_i*/
10.   endif
11. endfor
12. return C
```

FIG. 8

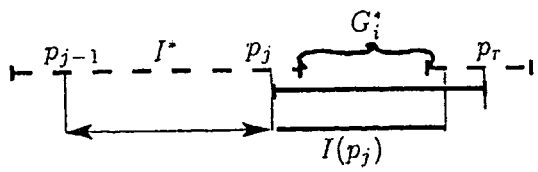

FIG. 9A

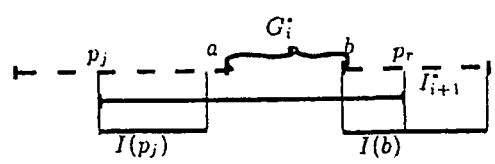

FIG. 9B

```
GREEDYMAX(P)
   P = {p_1,...,p_n}: sorted in increasing order;
   I_c = [I_c.l, I_c.r]: current interval;
1. C = {}; I_c = I(p_1);
2. for i = 2 to n
3.    if (p_i ∈ I_c)
4.       continue;
5.    if (p_i − I_c.l < 2 · length(I(p_i)))
6.       I_c.r = p_i;  /*extend I_c to cover p_i*/
7.    else
8.       C = C ∪ {I_c};
9.       I_c = I(p_i);  /*canonical interval of p_i*/
10.   endif
11. endfor
12. return C
```

FIG. 10

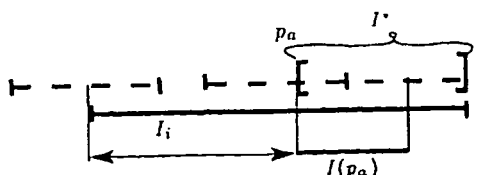

FIG. 11A

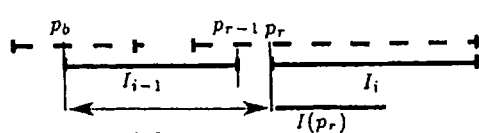

FIG. 11B

DECISIONPROCEDURE $\mathcal{D}(\mu)$
  $P = \{p_1, \ldots, p_n\}$: sorted in increasing order;
  $I_c = [I_c.l, I_c.r]$: current interval;

1. if ($\mu < e$)
2.   return "no";
3. $C = \{\}; I_c = \{\};$
4. for $i = 1$ to $n$
5.   if ($p_i \in I_c$)
6.     continue;
7.   if ($|[p_i, p_i + \mu] \cap P| \geq k$)
8.     $C = C \cup \{[p_i, p_i + \mu]\}$;
9.     $I_c = [p_i, p_i + \mu]$;
10.   else if ($p_i - I_c.l \leq 2\mu$)
11.     $I_c.r = p_i$; /*extend $I_c$ to cover $p_i$*/
12.   else
13.     return "no";
14.   endif
15. endfor
16. return "yes" and $C$

FIG. 12

DECISIONPROCEDURE $\mathcal{D}_2(\mu)$
  $P = \{p_1, \ldots, p_n\}$: arbitrary order;
  $CS = \{\sigma(p_i, \mu) \mid p_i \in P\}$: candidate squares
  $Q$: marked points;/*covered points are marked*/
  $C$: cover squares; $\mathcal{P}$: resulting partition;

1. $C = \{\}; Q = \{\}; \mathcal{P} = \{\}$;
2. for each $\sigma(p_i, \mu) \in CS$
3.   if ($p_i \in Q$) /*$p_i$ already covered*/
4.     continue;
5.   $P_i = \sigma(p_i, \mu) \cap (P \setminus Q)$;
6.   if ($P_i$ is $(k, e)$-anonymous)
7.     $C = C \cup \{\sigma(p_i, \mu)\}; \mathcal{P} = \mathcal{P} \cup \{P_i\}$;
8.     $Q = Q \cup \{P_i\}$; /*mark points in $P_i$*/
9.   endif
10. endfor
11. for each $\sigma(p_i, \mu) \in C$
12.   replace $\sigma(p_i, \mu)$ by $\sigma(p_i, 2\mu)$ in $C$;
13.   for each $q \in P \setminus Q$
14.     if ($q \in \sigma(p_i, 2\mu)$)
15.       $P_i = P_i \cup \{q\}$;
16.       $Q = Q \cup \{q\}$;
17.     endif
18.   endfor
19. endfor
20. if ($|P \setminus Q| \geq 1$)
21.   return "no";
22. else
23.   return "yes," together with $C$ and $\mathcal{P}$

FIG. 13

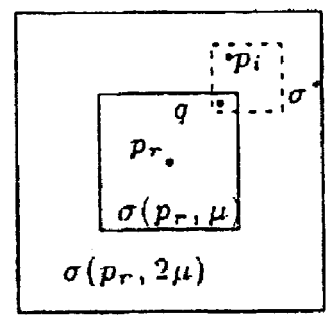

FIG. 14

COMPUTER SYSTEMS, METHODS AND COMPUTER PROGRAM PRODUCTS FOR DATA ANONYMIZATION FOR AGGREGATE QUERY ANSWERING

BACKGROUND

This invention relates to database systems, methods and computer program products and, more particularly, to systems, methods and computer program products for anonymizing data.

Large scale databases are widely used to store and manipulate data. For example, a database may include financial, demographic and/or medical records about large numbers of individuals. Data mining tools are widely used to query databases to identify relationships among the stored data.

As databases are widely distributed and queried, privacy preservation has become an increasingly sensitive problem. In releasing personal data for ad hoc analysis, one level of privacy may be obtained by removal of unique (personal) identifiers. However, even with the removal of personal identifiers, inferences can be made about individuals using some database elements that are referred to as "quasi-identifiers". By mining the quasi-identifiers that place individuals in a predefined category, inferences may be made about individuals. In fact, in the worst case, a personal identity can be reconstructed from the existing data taken alone or in combination with other databases.

In order to preserve privacy while allowing aggregate querying, anonymization techniques have been developed. These anonymization techniques can provide that, even if publicly available information is linked with a given database, a sensitive attribute value can, at most, be related to a group of a certain size, instead of to a specific individual. At the same time, the data anonymization should be able to preserve sufficient information to support ad hoc aggregate queries over the data.

SUMMARY OF THE INVENTION

Some embodiments provide computer program products for anonymizing a database that includes a plurality of tuples, a respective tuple including at least one quasi-identifier and a plurality of sensitive attributes associated therewith. These computer program products include computer readable program code that is configured to (k,e)-anonymize the plurality of tuples over a number k of different values in a range e of values, while preserving coupling at least two of the plurality of sensitive attributes to one another in the plurality of tuples that are anonymized, to provide a (k,e)-anonymized database. Computer readable program code is also provided that is configured to query the (k,e)-anonymized database in response to a user query and to output a result of the user query of the (k,e)-anonymized database based on the coupling of the at least two sensitive attributes to one another in the plurality of tuples that are anonymized.

In other embodiments, the computer readable program code that is configured to (k,e)-anonymize the plurality of tuples comprises computer readable program code that is configured to separately (k,e)-anonymize each of the plurality of sensitive attributes over a number k of different values in a range e of values, and is further configured to (k,e)-anonymize a projection of the plurality of tuples on any direction from a predefined set of directions.

In still other embodiments, the computer readable program code that is configured to (k,e)-anonymize the plurality of tuples further comprises computer readable program code that is configured to separately (k,e)-anonymize each of the plurality of sensitive attributes over a number k of different values in a range e of values, and is further configured to anonymize a projection of the plurality of tuples on any direction.

Computer program products for anonymizing a database according to still other embodiments include computer readable program code that is configured to partition the plurality of tuples into groups, a respective group including at least k different values of a linear combination of at least two of the plurality of sensitive attributes and a corresponding distance range of the linear combinations of the at least two of the plurality of sensitive attributes that is at least e, to provide a (k,e)-anonymous partition of the database that includes the plurality of sensitive attributes. Computer readable program code also is provided that is configured to permute as units, the at least two sensitive values in the respective groups of the (k,e)-anonymous partition of the database that includes the plurality of sensitive attributes, to provide a (k,e)-anonymous permutation of the database that includes the plurality of sensitive attributes. Finally, computer readable program code is provided that is configured to query the (k,e)-anonymous permutation of the database that includes the plurality of sensitive attributes in response to a user query and to output a result of the user query of the (k,e)-anonymous permutation of the database that includes the plurality of sensitive attributes to the user.

In some embodiments, the computer readable program code that is configured to partition the plurality of tuples into groups comprises computer readable program code that is configured to find a minimum size polygon that covers projections of the at least two of the plurality of sensitive attributes in a respective group. In other embodiments, the computer readable program code that is configured to partition the plurality of tuples into groups comprises computer readable program code that is configured to find a minimum size axis-parallel square that covers projections of the at least two of the plurality of sensitive attributes in a respective partition. In still other embodiments, the computer readable program code that is configured to find a minimum size axis-parallel square that covers projections of the at least two of the plurality of sensitive attributes in a respective group comprises computer readable program code that is configured to compute centered axis-parallel squares and computer readable program code that is configured to compute axis-parallel squares anchored to a grid from the centered axis-parallel squares.

In yet other embodiments, the computer readable program code that is configured to partition the plurality of tuples into groups comprises computer readable program code that is configured to sequentially and non-iteratively process a next sequential tuple in the database to determine whether to include the next sequential tuple into an existing group of the database or to begin a new group of the database, based on a smallest cost increase.

In other embodiments, a computer program product is provided for anonymizing a database that includes a plurality of tuples, a respective tuple including a quasi-identifier and a sensitive attribute associated therewith. Computer readable program code is provided that is configured to obtain a sorted database having the plurality of tuples that are sorted by the sensitive attribute. Computer readable program code also is provided that is configured to sequentially and non-iteratively process a next sequential tuple in the sorted database to determine whether to include the next sequential tuple into an existing group of the sorted database or to begin a new group of the sorted database, based on a smallest cost increase, so as to partition the plurality of tuples that are sorted by the sensitive attribute into groups, a respective group including at least k different values of the sensitive attribute and a corresponding range of the sensitive attribute that is at least e, to provide a (k,e)-anonymized database. Finally, computer readable program code is provided that is configured to query the (k,e)-anonymized database in response to a user query and to output a result of the user query of the (k,e)-anonymized database to the user.

In other embodiments, the computer readable program code that is configured to sequentially and non-iteratively process a next sequential tuple in the sorted database comprises computer readable program code that is configured to sequentially and non-iteratively process a next sequential tuple in the sorted database to determine whether to include the next sequential tuple into an existing group of the sorted database or to begin a new group of the sorted database, based on a minimum sum-of-error calculation.

In other embodiments, the computer readable program code that is configured to sequentially and non-iteratively process a next sequential tuple in the sorted database comprises computer readable program code that is configured to sequentially and non-iteratively process a next sequential tuple in the sorted database to determine whether to include the next sequential tuple into an existing group of the sorted database or to begin a new group of the sorted database, based on a minimum max-of-error calculation.

In still other embodiments, the computer readable program code that is configured to sequentially and non-iteratively process a next sequential tuple in the sorted database comprises computer readable program code that is configured to sequentially and non-iteratively process a next sequential tuple in the sorted database to determine whether to include the next sequential tuple into an existing group of the sorted database or to begin a new group of the sorted database, using a greedy algorithm. In yet other embodiments, the computer readable program code that is configured to sequentially and non-iteratively process a next sequential tuple in the sorted database to determine whether to include the next sequential tuple into an existing group of the sorted database or to begin a new group of the sorted database, scales on an order of a number of tuples in the plurality of tuples.

Finally, in still other embodiments, the computer readable program code that is configured to obtain a sorted database having the plurality of tuples that are sorted by the sensitive attribute comprises computer readable program code that is configured to obtain the database that includes the plurality of tuples, a respective tuple including a quasi-identifier and a sensitive attribute associated therewith, and computer readable program code that is configured to sort the database by the sensitive attribute.

Embodiments have been described herein primarily with respect to computer program products for anonymizing a database. However, analogous computer systems and computer-based methods for anonymizing a database may also be provided according to other embodiments.

Other systems, methods, and/or computer program products according to other embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 7 illustrates the diameter, width and directional width of a set P according to various embodiments.

FIG. 8 illustrates a Greedy Algorithm for sum-of-error measure according to various embodiments.

FIGS. 9A and 9B illustrate the two cases in Theorem 1: cheap optimal gap and an expensive optimal gap, respectively, according to various embodiments.

FIG. 10 illustrates a Greedy Algorithm for max-of-error measure according to various embodiments.

FIG. 11A and 11B illustrate the two cases in Theorem 2: $I_i$ extended over optimal anchors and $I_i$ did not extend over optimal anchors, respectively, according to various embodiments.

FIG. 12 illustrates a decision procedure: max-of-error for one sensitive attribute according to various embodiments.

FIG. 13 illustrates a decision procedure: centered squares according to various embodiments.

FIG. 14 illustrates the proof of Lemma 2 according to various embodiments.

DETAILED DESCRIPTION

Figure 1:
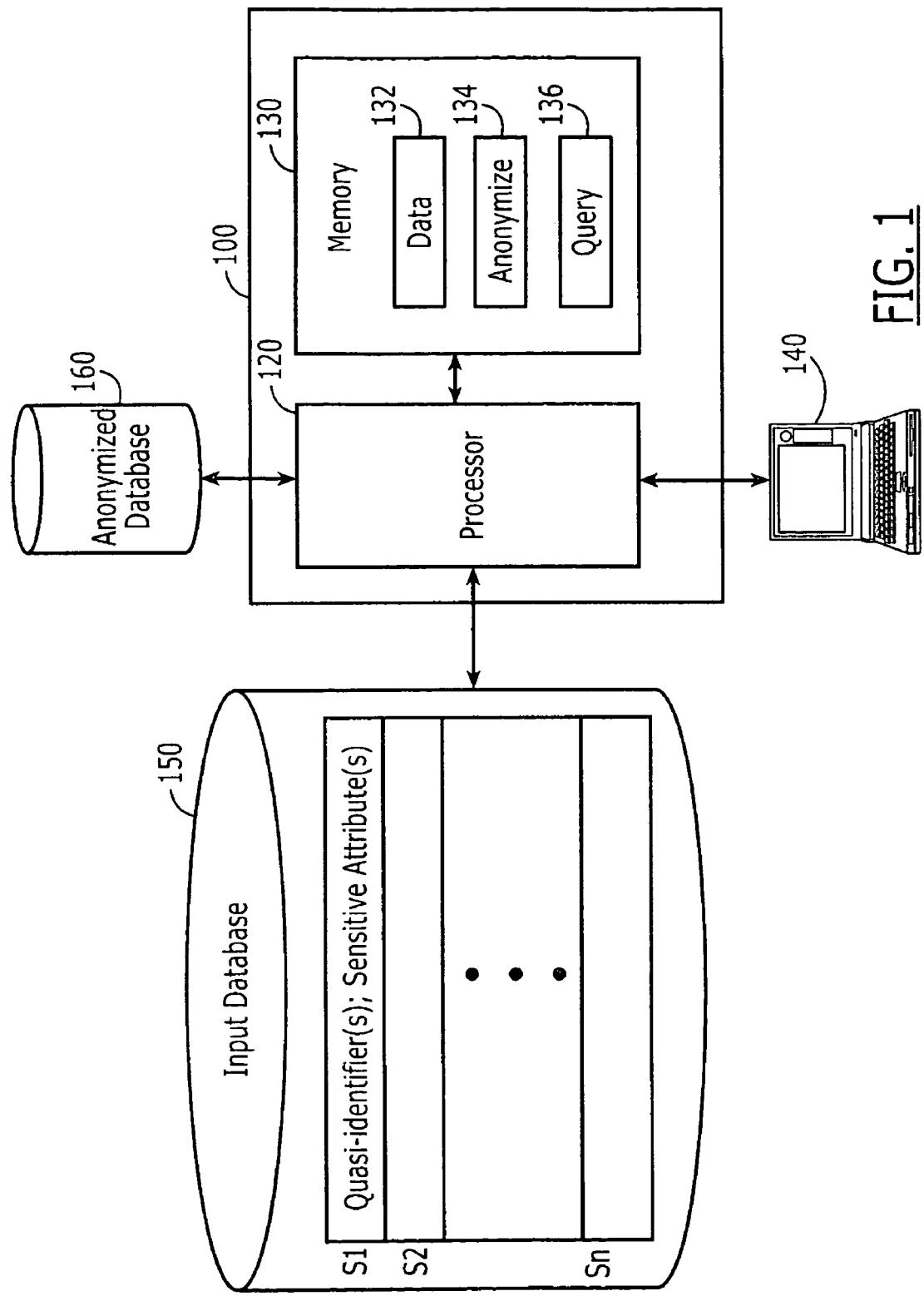
FIG. 1 is a block diagram of computer systems, methods and/or computer program products for anonymizing a database according to various embodiments.

Various embodiments now will be described more fully hereinafter with reference to the accompanying drawings, in which illustrative embodiments are shown. However, many different forms may be provided and should not be construed as limited to the embodiments set forth herein. Rather, these embodiments are provided so that this disclosure will be thorough and complete, and will fully convey the scope of various embodiments to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art in light of the present disclosure, and will not be interpreted in an idealized or overly formal sense unless expressly so defined herein.

The present invention is described in part below with reference to block diagrams and flowcharts of methods, systems and computer program products according to various embodiments. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. A computer program according to embodiments of the invention comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

FIG. 1 is a block diagram of anonymizing computer systems, computer-based methods and/or computer program products according to various embodiments. As shown in FIG. 1, these anonymizing systems, methods and/or computer program products include a computer system 100 that includes a processor 120 and a memory 130 that communicates with the processor 120. The processor 120 may be embodied as one or more enterprise, application, personal, pervasive and/or embedded computer systems and/or special purpose hardware that may be centralized and/or distributed and connected by a wired network and/or a wireless network. The memory 130 may represent an overall hierarchy of memory devices containing software and/or data including, but not limited to, the following types of memory devices: cache, ROM, PROM, EPROM, EEPROM, flash memory, SRAM, DRAM, removable and/or fixed media, as well as virtual storage. The memory 130 may also be centralized and/or distributed and connected by a wired network and/or a wireless network. The memory 130 may be at least partially embedded in processor 120 or may be separate therefrom.

As also shown in FIG. 1, the memory 130 includes a data module 132, an anonymizing module 134 and a query module 136. Other software, such as an operating system, also may be included. It will be further appreciated that the functionality of the anonymizing module 134 and/or query module 136 may be embodied, at least in part, using discrete hardware components, one or more Application Specific Integrated Circuits (ASIC) and/or a special purpose digital processor. A user input/output device 140, such as a personal computer, is configured to interact with the processor 120, and may be connected to the computer system 100 directly or via a wired network and/or a wireless network. Multiple input/output devices 140 also may be provided. It will be understood by those having skill in the art that the computer system 100 may include many other components, such as data buses, controllers, operating systems, mass storage systems, etc., that are not illustrated in FIG. 1 for ease of explanation.

Computer systems, computer-based methods and computer program products according to various embodiments of the present invention are configured to anonymize an input database 150. The input database 150 is a de-identified database, in that unique identifiers, such as Social Security numbers, names, addresses, bank account numbers, patient identification numbers, etc., have been removed. Nonetheless, the database 150 includes a plurality of tuples S1-Sn. A respective tuple includes at least one quasi-identifier, such as gender, age, zip code, etc., that can be used to place an individual into a smaller category. The input database 150 also includes one or more sensitive attributes, such as salary, medical reports, etc., for which anonymization is desirable. The input database 150 is operated upon by the anonymizing module 134 to produce anonymized database 160. The anonymized database 160 preserves sufficient information to support ad hoc aggregate queries over the data, while providing that a sensitive attribute can, at most, be related to a group of a certain size, instead of to a specific individual. The data area 132 of the memory 130 may be used to store the input database 150, the anonymized database 160 and/or intermediate values that are generated during processing. Thus, the input database 150 and the anonymized database 160 may be integrated, at least in part, in the computer system 100 or may be at least partially external of the computer system 100. Moreover, the input database 150 and the anonymized database 160 may be centralized and/or may be distributed and linked by a wired network and/or a wireless network. A database may also be referred to herein as a "table", and "tuples" may refer to rows of the table. The database may be stored and manipulated using any conventional technique.

The input/output device 140 may be used to input user queries to the anonymized database 160 and to output a result of the user query to the user. Multiple input/output devices 140 may be provided and the query need not be input from the same device 140 to which the results are output.

Figure 2:
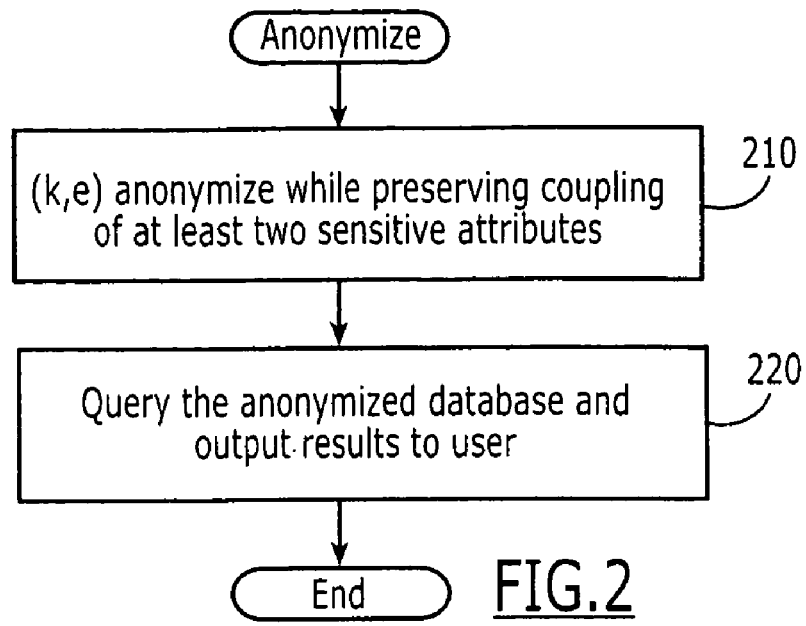
FIGS. 2, 3 and 4 are flowcharts of operations that can be performed for anonymizing a database according to various embodiments.

FIG. 2 is a flowchart of operations that may be performed to anonymize a database, such as the input database 150 of FIG. 1, according to various embodiments. The database 150 includes a plurality of tuples, a respective tuple including at least one quasi-identifier and a plurality of sensitive attributes associated therewith. At Block 210, the plurality of tuples are anonymized over a number k of different values in a range e of values, while preserving coupling of at least two of the plurality of sensitive attributes to one another in the plurality of tuples that are anonymized, to provide a (k,e)-anonymized database, such as the anonymized database 160 of FIG. 1. Operations of Block 210 may be performed by the anonymize module 134 of FIG. 1. Then, at Block 220, the (k-e)-anonymized database is queried in response to a user query, for example from input/output device 140 of FIG. 1, and outputs a result of the user query of the (k,e)-anonymized database, for example, to input/output device 140, based on the coupling of at least two sensitive attributes to one another in the plurality of tuples that are anonymized. Accordingly, embodiments of FIG. 2 can allow two or more sensitive attributes to be simultaneously anonymized.

In some embodiments of Block 210, each of the plurality of sensitive attributes is separately (k,e)-anonymized over a number k of different values in a range e of values, and a projection of the plurality of tuples on any direction from a predefined set of directions is also (k,e)-anonymized. In other embodiments of Block 210, each of the plurality of sensitive attributes is separately (k,e)-anonymized over a number k of different values in a range e of values, and a projection of the plurality of tuples on any direction is also anonymized.

Figure 3:
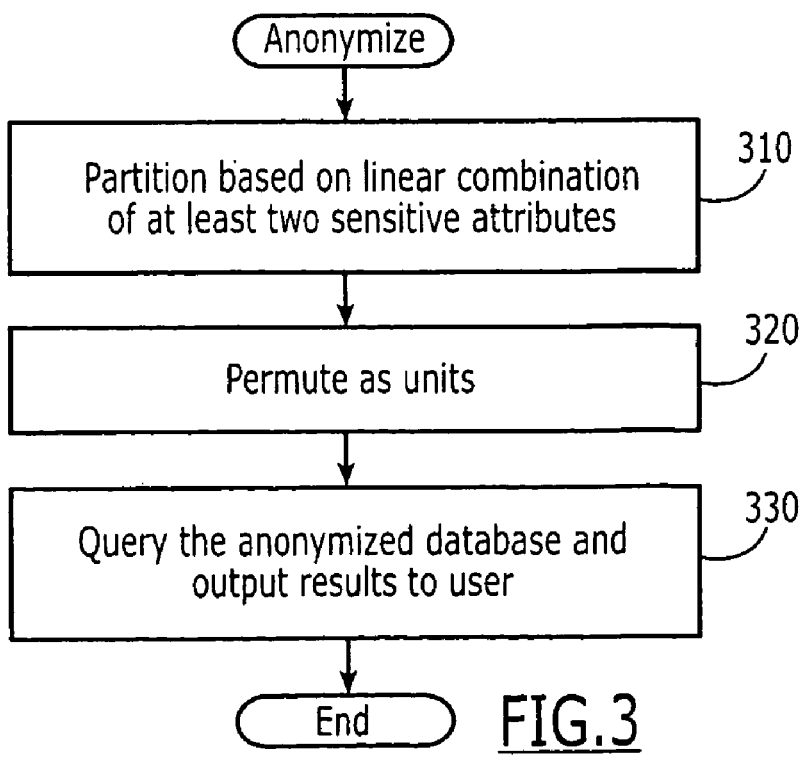

FIG. 3 is a flowchart of operations that may be performed according to other embodiments to (k,e)-anonymize two or more sensitive attributes, and may be regarded as a detailed embodiment of FIG. 2. In particular, referring to FIG. 3, the plurality of tuples are partitioned into groups at Block 310. A respective group includes at least k different values of a linear combination of at least two of the plurality of sensitive attributes, and a corresponding distance range of the linear combinations of the at least two of the plurality of sensitive attributes that is at least e, to provide a (k,e)-anonymized partition of the database that includes the plurality of sensitive attributes. Operations of Block 310 may be performed by the anonymize module 134 of FIG. 1 that operates on the input database 150 of FIG. 1.

Then, at Block 320, the at least two sensitive values in the respective groups of the (k,e)-anonymized partition of the database that includes the plurality of sensitive attributes are permuted as units, to provide a (k,e)-anonymous permutation of the database that includes the plurality of sensitive attributes, such as the anonymized database 160 of FIG. 1. Operations of Block 320 may also be performed by the anonymize module 134 of FIG. 1, operating on the input database 150 and/or a partitioned input database 150 that is stored in the data portion 132.

Finally, at Block 330, the (k,e)-anonymous permutation of the database that includes the plurality of sensitive attributes is queried in response to a user query, for example from input/output device 140 of FIG. 1, and a result of the user query of the (k,e)-anonymous permutation of the database that includes the plurality of sensitive attributes is output to the user, for example input/output device 140. Operations of Block 330 may be performed by the query module 136 of FIG. 1.

Additional embodiments of Block 310 will now be described according to various other embodiments. In particular, in some embodiments, the plurality of tuples are partitioned into groups by finding a minimum size polygon that covers projections of the at least two of the plurality of sensitive attributes in a respective group. In other embodiments, a minimum-size anchored square that covers projections of the at least two of the plurality of sensitive attributes in a respective group may be found. In still other embodiments, the minimum-size axis-parallel square that covers projections of the at least two of the plurality of sensitive attributes in a respective group is found.

Moreover, in other embodiments of Block 310, the plurality of tuples are partitioned into groups by sequentially and non-iteratively processing a next sequential tuples in the database, to determine whether to include the next sequential tuple into an existing group of the database or to begin a new group of the database, based on a smallest cost increase.

Figures 4, 5, 6:
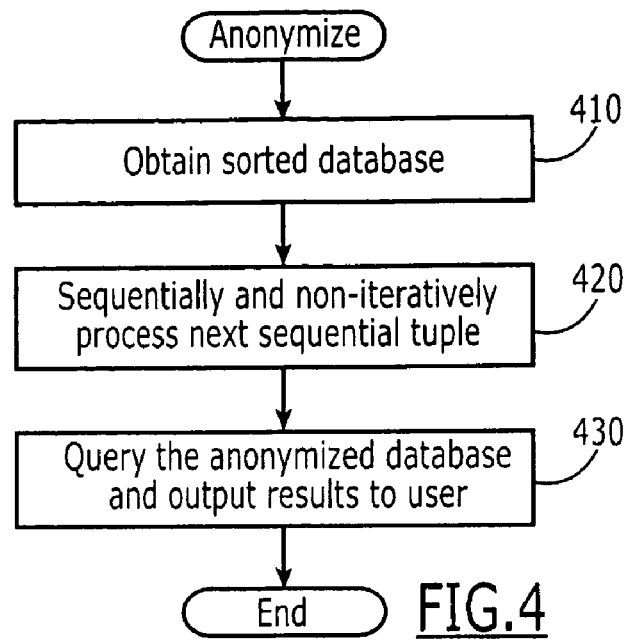
FIG. 5 illustrates an example de-identified table according to various embodiments.
FIG. 6 illustrates an example 3-anonymous table after permutation according to various embodiments.

FIG. 4 is a flowchart of anonymization according to still other embodiments of the present invention. Embodiments of FIG. 4 may be utilized to anonymize a database, such at the input database 150 of FIG. 1, that includes a plurality of tuples S1-Sn, a respective tuple including one or more quasi-identifiers and one or more sensitive attributes associated therewith.

Referring to FIG. 4, at Block 410, a sorted database is obtained that has the plurality of tuples that are sorted by the sensitive attribute. In some embodiments, the input database 150 may already be provided in sorted form. In other embodiments, the input database 150 may include the plurality of tuples, a respective tuple including a quasi-identifier and a sensitive attribute associated therewith, and operations of Block 410 may be configured to sort the input database 150 by the sensitive attribute. Operations of Block 410 may be performed by the anonymize module 134 of FIG. 1.

Then, referring to Block 420, a next sequential tuple in the sorted database is sequentially and non-iteratively processed, to determine whether to include the next sequential tuple into an existing group of the sorted database or to begin a new group of the sorted database. This determination may be based on a smallest cost increase. This determination partitions the plurality of tuples that are sorted by the sensitive attributes into groups, a respective group including at least k different values of the sensitive attribute and a corresponding range of the sensitive attribute that is at least e, to provide a (k,e)-anonymized database, such as the anonymized database 160 of FIG. 1. Operations of Block 420 may be performed by the anonymize module 134 of FIG. 1.

Finally, referring to Block 430, the (k,e)-anonymized database may be queried in response to a user query, for example from input/output device 140, and the result of the user query of the (k,e)-anonymized database is output to a user, for example to a user input/output device 140. These operations may be performed by the query module 136 of FIG. 1.

Embodiments of FIG. 4 may anonymize a database efficiently, so that large databases may be anonymized in a reasonable time. Efficient anonymization may take place by sequentially and non-iteratively processing the next sequential tuple as described in Block 420.

Various embodiments of sequentially and non-iteratively processing the next sequential tuple, corresponding to Block 420 of FIG. 4, may be provided. In some embodiments, a minimum sum of error calculation may be used to sequentially and non-iteratively process a next sequential tuple in the sorted database, to determine whether to include the next sequential tuple into an existing group of the sorted database or to begin a new group of the sorted database. In other embodiments, a minimum max-of-error calculation may be used. In still other embodiments, a greedy algorithm may be used. In any of these embodiments, the operations of Block 420 can scale on an order of a number of tuples in the plurality of tuples, so that large databases may be anonymized in a reasonably sized computer system 100.

Additional discussion of various embodiments will now be provided. In particular, privacy protection is a major concern when microdata needs to be released for ad hoc analyses. This has led to a lot of recent research in privacy goals and table anonymization schemes, such as k-anonymity, l-diversity, t-closeness and (k, e)-anonymity. The table anonymization should preserve sufficient information to support ad hoc aggregate queries over the data, and to return reasonably accurate answers. The recent framework of permutation-based anonymization was shown to be better than generalization based approaches in answering aggregate queries with sufficient accuracy, while providing strong anonymity guarantees. Various embodiments focus attention on the case when the sensitive attributes are numerical (e.g., salary) and (k, e)-anonymity has been shown to be an appropriate privacy goal. Various embodiments develop efficient algorithms for several criteria to increase or optimize accurate answering of aggregate queries, under permutation-based anonymization schemes, which can significantly improve on previous results. Various embodiments also extend the framework to higher dimensions (i.e., two or more sensitive attributes are simultaneously anonymized), show that optimizing the query accuracy criteria is NP-Hard, and develop provably efficient approximation algorithms in this case. Various embodiments are evaluated on a large real dataset, and are shown to be scalable and accurate.

I. Introduction

Compared with the release of pre-aggregated data, the release of microdata enables ad hoc analyses in many domains, such as public health and population studies. However, the latter raises significant concerns about leakage of an individual's private information [12], leading to a lot of recent research in privacy goals and table anonymization schemes, such as k-anonymity [3], l-diversity [9], t-closeness [8] and (k, e)-anonymity [14]. Intuitively, they can guarantee that even if publicly available information is linked with microdata, a sensitive attribute value can at most be related to a group of a certain size, instead of to a specific individual. Various embodiments focus attention on the case of numerical sensitive attributes for which (k, e)-anonymity was shown to be an appropriate privacy goal.

It is desirable that the table anonymization preserves sufficient information to support ad hoc aggregate queries over the data (e.g., what is the average salary+bonus of men over age 50 in Texas?), and to return reasonably accurate answers. The recent framework of permutation-based anonymization [13], [14] is a natural generalization of data swapping techniques where privacy is achieved by exchanging the sensitive attributes of pairs of randomly selected records [2], and was shown to be better than generalization based approaches (see, e.g., [9], [8]) in answering aggregate queries with sufficient accuracy, while providing strong anonymity guarantees.

Zhang et al. [14] identified two criteria (minimum sum-of-error and minimum max-of-error) to optimize accurate answering of aggregate queries over a single sensitive attribute, under a permutation-based (k, e)-anonymization scheme. For the minimum sum-of-error problem, they proposed an $O(n^2)$ dynamic programming algorithm for obtaining an optimal solution, where n is the number of tuples in the table. For the minimum max-of-error problem, they proposed an $O(n^6)$ algorithm for obtaining an optimal solution, and an $O(n^2)$ algorithm for obtaining a 2-approximation. Various embodiments can significantly improve these previous results, and present faster algorithms for these optimization criteria, enabling them to be deployed for much larger databases.

Various embodiments can provide an O(n) algorithm for the minimum sum-of-error problem (assuming the table is already sorted on the sensitive attribute), which computes a 2-approximation. If the table is not sorted, the algorithm may require O(n log n) time.

For the minimum max-of-error, various embodiments can formulate an O(n) algorithm that computes a 3-approximation (assuming the table is already sorted on the sensitive attribute; otherwise, it may require O(n log n) time), an O(n log n) algorithm that computes a 2-approximate solution, and an $O(n^4)$ dynamic programming algorithm that computes the optimal solution.

Previous work focused on aggregate queries over a single sensitive attribute (e.g., average salary). One may desire to pose aggregate queries over multiple sensitive attributes (e.g., maximum salary+bonus). According to various embodiments, to enable accurate answering of such aggregate queries, the permutation-based (k, e)-anonymization framework is extended to higher dimensions, i.e., two or more sensitive attributes that are simultaneously anonymized. For this case, various embodiments can make the following contributions:

Various embodiments extend the definitions of a (k, e)-anonymous partition and of the error measure, and relate them to the width and diameter of point sets.

For the minimum max-of-error problem in two dimensions, various embodiments can show that it is NP-hard to not only compute the optimal solution, but also compute a ($\sqrt{2}-\epsilon$)-approximate solution, for any $0<\epsilon<1$.

For the minimum max-of-error problem in two dimensions, various embodiments present an $$O\left(\frac{n\log^2 n}{\epsilon^{O(1/\epsilon)}}\right)$$

algorithm for two anonymity models, and an $$O\left(\frac{n^2\log^2 n}{k\ \epsilon^{O(1/\epsilon)}}\right)$$

algorithm for a third model. They each compute a $(3+\epsilon)$-approximate solution. Various embodiments also show that, at the price of computing a slightly infeasible (k, $(1-\epsilon)e$) solution, the running time of the second algorithm can be made quasi-linear. An experimental evaluation of 1-dim.

methods according to various embodiments, which shows that they are highly scalable and accurate.

Related Problems As mentioned above, the error measure of a set is its diameter. Thus, various embodiments may be related to clustering to minimize the (max or sum) of cluster diameters. The latter are known to be NP-Hard, and a $(2-\epsilon)$-approximation is also NP-Hard [4]. In various embodiments, the number of clusters is not given, and various embodiments also take into account the (k, e)-conditions. If sum of distances is replaced by sum of squared distances, the problem becomes an instance of constraint-driven clustering. This was proven NP-Hard in [6], which also proposes a heuristic approach to computing good solutions.

II. Preliminaries

This section first reviews the main definitions from the permutation based framework proposed in [14]. The framework is then extended to multiple sensitive attributes. Let M denote the original microdata table, and let ID, QI be the tuples that are identifiers, respectively quasi-identifiers, in M. Let S denote one sensitive numerical attribute of M. The general strategy for permutation-based anonymization of M has the following three steps:

Step 1. Project M over QI and S, to obtain a de-identified microdata table D (e.g., 150 of FIG. 1);

Step 2. Partition D according to the (k, e)-anonymity conditions (e.g., Block 310 of FIG. 3);

Step 3. Permute the sensitive values inside each group of the partition, so that the association between QI and S is broken (e.g., Block 320 of FIG. 3).

The output of Step 2 is referred to as a (k, e)-anonymous partition of D, and the output of Step 3 is called a (k, e)-anonymous permutation of D. Step 3 breaks the link between QI and S in D, as follows: Let $T=\{t_1, \ldots t_n\}$ be a set of n tuples with attributes $\{a_1, \ldots a_m\}$, and let p be a random permutation over $\{1, \ldots, n\}$. Then the permutation of T, denoted $p(T, \{a_1, \ldots a_l\}, \{a_{l+1}, \ldots a_m\})$ is defined as the set of tuples $\{t'_i | \forall j, 1 \leq j \leq l, t'_i[a_j]=t_i[a_j]$ and $\forall j, l+1 \leq j \leq m, t'_i[a_j]=t_{p(i)}[a_j]\}$.

In the (k, e)-anonymity framework, each group $D_i \subseteq D$ computed in Step 2 is permuted via a random permutation $p(D_i, QI, \{S\})$ i.e., the sensitive values in each group are randomly permuted among the tuples in the group.

However, the main challenge of the approach is Step 2. The goal is to compute a (k, e)-anonymous partition of D, as defined below.

Definition 1:[14] Let D be a de-identified microdata table with attributes QI and S, and let $\{D_1, \ldots, D_m\}$ be a partition of D. A group $D_i$ is (k, e)-anonymous w.r.t. S if the projection of $D_i$ over the sensitive attribute S contains at least k different values, and the range of these values in $D_i$ is at least e. The partition is (k, e)-anonymous w.r.t. S if each $D_i$ in the partition is (k, e)-anonymous.

FIG. 5 shows an example of a de-identified table such as 150 of FIG. 1, i.e., the result of Step 1 above. Assume for the moment that the only sensitive attribute in the table is salary. FIG. 6 shows a possible (3, 1000)-anonymous permutation of the table, such as 160 of FIG. 1. First a grouping is computed in Step 2, and recorded as a new attribute groupID. Then the salary values in each group are permuted randomly in Step 3.

841 A table D may have many (k, e)-anonymous partitions. Not all such partitions return equally accurate estimates of range queries. Assume, for example, that the query has some arbitrary selection conditions over QI, and requires computing the SUM of the sensitive values of S for all tuples satisfying the selection criteria. In each group $D_i$, a fixed number of tuples, say mi, satisfy the selection. But due to the permutation, anywhere from the smallest to the largest $m_i$ values may be selected. Thus, a quality measure $\mu(D_i)$ is defined for each $D_i$, and the overall quality measure of the partition is a function of all $\mu(D_i)$. In [14], the authors propose $\mu(D_i)=\max(S_i)-\min(S_i)$, where $S_i$ is the projection of $D_i$ over the sensitive attribute S; i.e., $\mu(D_i)$, is the difference between the maximum and minimum sensitive values in group $D_i$. They also propose two quality measures for a partition D as follows:

$$\text{Sum-of-error: } \mu(D) = \sum_{i=1}^{m} \mu(D_i);$$

$$\text{Max-error: } \mu(D) = \max_{i=1}^{m} \mu(D_i);$$

A goal is to compute the partition D that minimizes $\mu$. In the first case, the optimization problem is called minimum sum-of-error problem, while in the second case it is called the minimum max-of-error problem.

Multiple sensitive attributes: Various embodiments extend the previous framework to simultaneously anonymize multiple sensitive numerical attributes $S_1, \ldots S_d$, $d \geq 2$. Refer again to the example in FIG. 5, but this time assume that both the salary and the bonus columns are present. Consider now the partition in FIG. 6. In this case, the pairs of salary and bonus values are permuted together. This is an important condition so that queries that combine both attributes remain meaningful (otherwise, the previous framework can be applied to each sensitive attribute separately) (Block 210 of FIG. 2). What does (k, e)-anonymity mean in this context? The most natural extension is to impose (k, e)-conditions along each attribute separately. In this case, both salary and bonus are (3, 1000)-anonymous, so the privacy appears sufficient. However, a subtle but severe privacy breach is possible for the table in FIG. 2. Suppose that the bonuses are computed as bonus=X+0.1×salary, where 0.1×salary is the target bonus, and X is an amount tightly correlated with employee performance. The formula for the bonus is known, but X varies for different people. However, in this case, all tuples in group 2 have X=0, which can be readily determined by any attacker. Thus, an attacker deduces how employees in group 2 were evaluated, with 100% certainty. To remedy this, various embodiments change the partition. For example, various embodiments can switch the groups between tuples 3 and 4, and between tuples 6 and 7. What various embodiments do, in fact, is impose a new (k, e)-type condition, on the linear combination of sensitive attributes bonus−0.1×salary (Block 310 of FIG. 3). Should various embodiments impose such conditions on other linear operators—or perhaps on all of them? Should various embodiments impose only a minimum range e of values, but not require k distinct ones? (Note that for projections along certain directions, there may not exist k distinct values in the entire set.) The more conditions various embodiments impose, the less utility various embodiments may have: certain linear correlations may be useful to detect, and may not infringe on privacy. Various embodiments therefore propose the following three levels of privacy, and provide methods for computing partitions under any of them. The choice among the three models can rest with the DBMS administrator.

Definition 2: Let D be a de-identified microdata table with attributes QI and $S_1, \ldots S_d$ where $S_1, \ldots, S_d$ are the sensitive numerical attributes. Let $\{D_1, \ldots, D_m\}$ be a partition of D. The partition is called:

Basic (k, e)-anonymous if it is (k, e)-anonymous w.r.t. each sensitive attribute $S_1, \ldots, S_d$.

Advanced (k, e)-anonymous if it is basic (k, e)-anonymous, and when projecting D on any direction v from a predefined set of directions, the corresponding partition of projected values is (k, e)-anonymous w.r.t. v.

Generalized (k, e)-anonymous if it is basic (k, e)-anonymous, and when projecting D on any direction v, the range of values in each corresponding partition on v is at least e.

Note that various embodiments could define a fourth model, which requires that the projection of the partition on any direction is (k, e)-anonymous. However, such a partition would have little utility, and would be expensive to compute. The anonymity conditions above have the following geometric interpretation. Consider the d-dimensional space spanned by attributes $S_1, \ldots S_d$. For any tuple $t=(t_1, \ldots, t_d)$ in this space, and any unit vector $(v_1, \ldots, v_d)$, the value $(v, t) = v_1 t_1 + \ldots + v_d t_d$ is the projection of t on the direction of v. The difference $$\text{width}(v, D_i) = \max_{i \in D_i} \langle v, t \rangle - \min_{i \in D_i} \langle v, t \rangle,$$

called the directional width of $D_i$ along v, is the length of the projection interval of $D_i$ on v. See FIG. 7. The smallest directional width, denoted width($D_i$), is equal to the smallest distance between two parallel hyper-planes that enclose $D_i$. Thus, advanced (k, e)-anonymity requires width(v, $D_i$)≧e for a fixed set of directions v, and generalized (k, e)-anonymity requires width($D_i$)≧e.

Now define the quality measure of a partition. First consider examples of how the table in FIG. 6 would be queried. In order to compute the total income paid to employees in a year, various embodiments would query with SUM(salary+bonus). On the other hand, one may wish to calculate the total taxes withheld during the month in which the bonus is paid. If all employees have the same effective tax rate r, then the operator r((salary/12)+bonus) computes the total tax during that month. If there are m different tax rates $r_1, \ldots, r_m$, where $r_i$ depends on the employee zip codes, then various embodiments compute SUM($r_i$((salary/12)+bonus)) over employees in the zip code corresponding to $r_i$, and sum up the results. Since the linear operators depend on each query, the quality measure must reflect the error made for any operator, i.e. the maximum error. Define it as follows.

Definition 3: Let $\{D_1, \ldots, D_m\}$ be a partition of D, where D has sensitive attributes $S_1, \ldots S_d$. For each $D_i$, the error measure $\mu(D_i)$ is defined as $$\mu(D_i) = diam(D_i) = \max_{v: \text{ unit vector}} \text{width}(v, D_i).$$

Hence, $\mu(D_i)$ is the maximum error for any (normalized) linear combination of sensitive attributes. This is equal to the largest distance between two points in Di; see FIG. 7.

III. One Sensitive Attribute

In this Section various embodiments provide algorithms for computing partitions for the case of a single sensitive attribute, under both minimum sum-of-error, and minimum max-of-error criteria. Various embodiments can significantly improve on previous results for both optimal and approximate partitions. Let $P=\{p_1, \ldots, p_n\}$ be the set of (unique) values of the sensitive attribute S over the entire table D. Computing a (k, e)-anonymous partition is equivalent to covering the set P by a set of intervals $C=\{J_1, J_2 \ldots\}$ with endpoints in P so that each p∈P can be assigned to an interval J that covers it, and the subset $P_i$ assigned to $J_i$ is (k, e)-anonymous, ∀i. By extension, we say that the cover C is (k, e)-anonymous.

A. Minimum Sum-of-Error

Various embodiments can provide a greedy algorithm for sequentially and non-iteratively computing a cover of P by a set of intervals $C=\{J_1, J_2 \ldots\}$ that is (k, e)-anonymous (e.g., Block 420 of FIG. 4). The optimal cover is the one that minimizes $\mu(C) = \Sigma_i \text{length}(J_i)$. Call $\mu(C)$ the cost of the cover, which is equivalent to the sum-of-error for the corresponding partition. Let $p_1, \ldots, p_n$, be the points of P in sorted order.

Definition 4: For any point p∈P, the canonical interval I(p)=[p,q] is the smallest interval such that q∈P, q−p≧e, and |[p,q]∩P|≧k. In no such q exists, then the canonical interval is I(p)=[p, ∞].

Various embodiments first compute the canonical intervals for all p∈P. If $p_i < p_{i+1}$, are consecutive points in P, and $q_i$, resp. $q_{i+1}$, are the right endpoints of their canonical intervals, then $q_i \leq q_{i+1}$. Various embodiments compute, in O(n) time, all canonical intervals by scanning P once, and maintaining two pointers, for the left and right endpoints of each canonical interval (once the right pointer goes past $p_n$, it is set to ∞).

The greedy algorithm is described in FIG. 8. It scans the points from left to right and maintains a current interval [$I_v$, I, $I_v$, r]. There are two choices to cover a point $p_i$: either by extending the current interval, or by starting a new interval with $p_i$ as its left endpoint. In the latter case, the smallest such interval that is (k, e)-anonymous is, by definition, $I(p_i)$—which becomes the new current interval. The decision on which way to cover $p_i$ is greedy—the algorithm chooses the variant that results in the smallest cost increase (e.g., Block 420 of FIG. 4). Various embodiments now prove that this results in a 2-approximate cover.

Theorem 1: Let $\mu^*$ be the cost of an optimal cover of P under the sum-of-error measure. The greedy algorithm in FIG. 8 computes a cover C of P with $\mu(c) \leq 2\mu^*$, in time O(n).

Proof: Let $C=\{I_1, I_2, \ldots, I_m\}$ be the cover computed by the greedy algorithm. As observed in [14], there exists an optimal cover of P in which no two intervals overlap. Let $C^*=\{I^*_1, I^*_2, \ldots\}$ be such an optimal cover. Denote by $G^*_1, G^*_2, \ldots$ the optimal gaps between consecutive intervals in $C^*$. Formally, if $I^*_i=[a,b]$ and $I^*_{i-1}=[c,d]$ are two consecutive intervals in $C^*$, where a, b, c, d∈P, then the optimal gap $G^*_i=(b,c)$. The proof will bound the length of the optimal gaps covered by C. Note that if C does not cover any optimal gaps, then all intervals $I_\ell \in C$ lie entirely inside intervals of $C^*$, in which case $\mu(C) \leq \mu(C^*) = \mu^*$.

Let $G^*_i$ be an optimal gap spanned by an interval $[p_j, p_r] \in C$. See FIGS. 9A and 9B. Since $p_j$ is the left point of an interval in C, step 9 was executed for $p_j$. Hence, $p_j - p_{j-1} > \text{length}(I(p_j))$.

There are two cases: If $G^*_i \subset I(p_j)$ length($G^*_i$)≦length(I($p_j$))<$p_j - p_{j-1}$. Since $p_j$ is a left endpoint of an interval in C, it follows that $p_{j-1}$ is the right endpoint of the preceding interval. Thus, the distance $p_j - p_{j-1}$ does not contribute to the cost $\mu(C)$. By contrast, $p_j - p_{j-1}$ contributes to $\mu^*$. Let $I^* \in C^*$ be the optimal interval that covers $p_j$. Since $I^*$ lies to the left of $G^*_i$. Thus, $p_j$ cannot be the left endpoint of $I(p_j)$. Otherwise, $I(p_j) \subset I^*$ by the definition of $I(p_j)$. But then $G^*_i \subset I(p_j) \subset I^*$, a contradiction. Hence, $p_{j-1}$ must also be covered by $I^*$, so $p_j - p_{j-1}$ contributes to $\mu^*$. Since length($G^*_i$)<$p_j - p_{j-1}$, the contribution of length($G^*_i$) to $\mu(C)$ is canceled out by the contribution of $p_j - p_{j-1}$ to $\mu^*$. Call $G^*_i$ a cheap optimal gap.

In the second case, $G^*_i \not\subset I(p_j)$. Let $G^*_i = (a,b)$, with a,b consecutive points in P. When the algorithm reached point b, step 6 must have been executed, extending the current interval with left endpoint $p_j$ to cover b. By the test in step 5, $b - a = \text{length}(G^*_i) \leq \text{length}(I(b))$. By definition, b is the left endpoint of the optimal interval $I^*_{i+1}$. Hence $I(b) \subseteq I^*_{i+1}$. Deduce that length($G^*_i$)≦length($I^*_{i+1}$). Call $G^*_i$ an expensive optimal gap.

The cost μ(C) has three components: the total length of the intersections between the intervals I∈C and optimal intervals I*∈C*; the total length of cheap optimal gaps; and the total length of expensive optimal gaps. By the above, each of the first and third components are at most μ*, while the second component is canceled out when comparing μ(C) and μ*. Thus, μ(C)≦2μ.

B. Minimum Max-of-error

Various embodiments can provide two (quasi)linear approximation algorithms, as well as a slower exact algorithm, for computing a (k, e)-anonymous cover of P by intervals C={$J_1, J_2, \ldots$}, for max-of-error cost. The goal in this case is to minimize the cost μ(C)=$\max_i$length($J_i$).

3-Approximation: Various embodiments can provide a greedy strategy to compute a 3-approximate solution in O(n) time (assuming P is sorted) (Block 410 of FIG. 4), in one scan of the data. The algorithm in the next subsection achieves a 2-approximation in O(nlog n) time, but requires more sophisticated techniques. The GREEDYMAX algorithm from FIG. 10 is similar to the GREEDYSUM algorithm, except that the decision on how to cover $p_i$ takes into account the max-of-error measure: the cost of covering $p_i$ by extending $I_c$ is the length of the extended interval, i.e., $p_i$-$I_c$I. Various embodiments prove that this method achieves a 3-approximation.

Theorem 2: Let μ* be the cost of an optimal cover of P under the max-of-error measure. The greedy algorithm in FIG. 10 computes a cover C of P with μ(C)≦3μ*, in time O(n).

Proof: Let C={$I_1, I_2, \ldots I_m$} be the cover computed by the greedy algorithm. Let C*={$I^*_1, I^*_2, \ldots$} be an optimal cover of P, of cost μ*. Call the left endpoints of the intervals in C* the optimal anchors in P. By definition of canonical intervals, for any optimal anchor $p_a$=I*.I.I($p_a$)⊆I*, so length(I($p_a$))≦μ*.

The proof is by induction over the intervals in C. Assume that length($I_{i-1}$)≦3μ*. For $I_i$ there are two cases. In the first case, the algorithm executed Step 6 for at least one optimal anchor, during the computation of $I_i$. Let $p_a$=I*, I∈$I_i$, be the rightmost such optimal anchor. See FIG. 11A. Then $p_a$-$I_i$.I<2·length I($p_a$))≦2μ*. Since $p_a$ is the rightmost optimal anchor in $I_i$, after covering $p_a$ the interval $I_i$ was extended at most over the points in I*. Hence, length($I_i$)≦$p_a$-$I_i$·I+μ*<3μ*. In the second case, $I_i$ was not extended over any optimal anchor. See FIG. 11B. When the algorithm reached the point $p_r$=$I_i$·I, it must have executed step 9. Let $I_{i-1}$=[$p_b$; $p_{r-1}$] be the previous interval in C. Since the test in Step 5 failed.

$$\text{length}^-(I(p_r)) \leq \frac{p_r - p_t}{2} = \frac{\text{length}(I_{a-1}) - p_r - p_{r-1}}{2}.$$

If $p_{r-1}$ and $p_r$ are covered by the same optimal interval in C*, then $p_r$-$p_{r-1}$≦μ*, and length(I($p_r$))≦2μ*. Otherwise, $p_r$ is an optimal anchor, so length(I($p_r$))<μ*. Since $I_i$ was not extended over any optimal anchor, it is deduced that $I_i$ is obtained by extending I($p_r$) by no more than μ*. Thus, length($I_i$)≦length(I($p_r$))+μ*≦3μ*.

2) 2-Approximation: This approach is to do a binary search on the set M of possible values for μ*. At each step, execute the decision procedure described in FIG. 12. The binary search repeatedly halves the current interval [$μ_1, μ_2$]⊆M of possible values, maintaining as invariant that D($μ_1$) returns "no," and D($μ_2$) returns "yes". Since D($μ_1$) returns "no," Lemma 1 implies that $μ_1$<μ*. At the end, $μ_1$ and $μ_2$ are consecutive values in M. Since μ*∈M, deduce that $μ_2$≦μ*, and the cover computed by D($μ_2$) has cost at most 2μ*. Note that, even though it cannot be distinguished whether μ<μ* or μ≧μ* when D(μ) returns "yes," various embodiments do not need this in order to guarantee a 2-approximation.

The decision procedure is as follows. Choose, from left to right, canonical intervals of points that are not already covered, provided that each canonical interval has length at most μ. If a point p is not covered by the interval immediately to its left (i.e. the current interval $I_c$), and if its canonical interval is too long, i.e. length(I(p))>μ, try to cover p by extending $I_c$. If the required extension makes $I_c$ longer than 2μ, return "no."

Lemma 1: Let μ* be the cost of an optimal cover of P under the max-of-error measure. If μ≧μ*, the procedure D(μ) from FIG. 12 returns "yes," together with a (k, e)-anonymous cover of cost at most 2μ, in O(n) time.

Proof: If μ≧μ*, there exists a (k, e)-anonymous cover of P of cost μ. Let $C_μ$={$J_1, J_2, \ldots$} be such a cover. The proof is by contradiction. Assume that D(μ) returns "no," and let $p_i$ be the point for which Step 13 is executed (Step 2 cannot be executed, since μ≧μ*≧e). Hence, the test in Step 10 fails on p=. This implies that $p_i$-I·I>2μ for any interval I which was the current interval during some iteration j≦i (by construction, left endpoints of older intervals are smaller than the left endpoint of the current interval).

Let J∈$C_μ$ be an interval that covers $p_i$, and let $p_j$≦$p_i$ be the left endpoint of J. Since [$p_i,p_j+μ$]⊇J, deduce |[$p_j,p_j+μ$]∩P|≧k. This means that $p_i$≠$p_j$, as Step 7 fails on $p_i$. If Step 8 was executed on $p_j$, then [$p_j,p_j+μ$] was a current interval after iteration j. By the observation above, deduce $p_i$-$p_j$>2μ, a contradiction, since $p_i,p_j$∈J. Thus, Step 5 must have succeeded on $p_j$. Therefore, there exists $p_r$<$p_j$ so that $p_j$∈$I_c$=[$p_r,p_r+μ$] at the start of iteration j. Then $p_i$-$p_r$=($p_i$-$p_j$)+($p_j$-$p_r$)≦2μ, a contradiction. Thus, D(μ) returns "yes." By construction, the intervals of C are mutually disjoint, so Steps 1 and 7 insure that they are (k, e)-anonymous. The tests in Steps 5 and 8 insure that their length is at most 2μ.

The value μ* is the distance between a pair of points in P. Thus, set M has size O($n^2$). Rather than generating it explicitly, various embodiments can rely on the technique first introduced by Frederickson and Johnson [5]. They showed that, if a set M can be represented as an m×n matrix so that each column is sorted, then an optimization problem over M can be solved in time O(T max{log m, log n}+n log m), where T is the time of the decision procedure. The algorithm only requires a succinct representation of M with certain properties. In various embodiments, column i contains the sorted distances between $p_i$ and the points $p_j$, $p_j$>$p_i$. The sorted order on P is an implicit representation for all columns. A detailed description of the binary search over the same set M (for different decision problems) is provided in [7]. Thus, conclude with the following.

Theorem 3: Let μ* be the cost of an optimal cover of P under the max-of-error measure. A binary search using the decision procedure in FIG. 12 computes a cover C of P with μ(C)≦2μ*, in time O(n log n).

3) Exact Algorithm: Various embodiments also can provide a dynamic programming algorithm for computing an exact solution in O($n^4$) time. Assume that P is sorted. Sweep a vertical line 1 from left to right and to maintain a partial cover for all the points p∈P lying to the left of 1. Hence, a partial cover with respect to 1 contains only intervals that lie to the left of 1, or intersect 1. To bound the number of possible partial covers, use the following result, proven in [14]:

Proposition 1: There exists an optimal cover C of P so that the intersection of any three intervals in C is empty. For any partial cover C, if an interval J∈C does not intersect the current sweep line, then J can be ignored for the remainder of the procedure since it cannot cover any of the remaining points. Thus, divide a partial cover C into two sets: the set $C_I \subset C$ of intervals that do not intersect 1—which we call inactive intervals; and the set $C_A \subset C$ of intervals that intersect 1, which we call active intervals. By Proposition 1, it is sufficient to consider only covers C for which $|C_A| \leq 2$. Note that for the current position of 1, only the left endpoints of the intervals in $C_A$ have been encountered, and the right endpoints are unknown. Maintain the invariant that for any partial cover C, $C_I$ is (k, e)-anonymous. To expand C correctly when 1 advances, store the number of points geometrically covered by $C_A$ and that have not already been assigned to intervals in $C_I$. Points are assigned to an interval in $C_A$ only after 1 reaches the right endpoint of the interval.

A partial cover C is represented as follows: Store the set $C_I$, and we maintain a signature of C with respect to 1, which implicitly represents $C_A$. The signature is defined as the tuple $\sigma=(p_{i_1}, p_{i_2}, v)$, such that $p_{i_1}, p_{i_2} \in P$, $p_{i_1} < p_{i_2}$ are the left endpoints of the intervals in $C_A$ (if only one interval is active, let $p_{i_2} = \sqrt{}$; if no interval is active, let $p_{i_1} = p_{i_2} = \infty$); and v is the number of unassigned points between $p_{i_1}$ and 1 (inclusive). Moreover, if two partial covers $C^1$ and $C^2$ have the same signatures with respect to 1, but $\mu(C_I^1) < \mu(C_I^2)$, then only $C_I^1$ is stored (since they have the same signatures, $C^1$ and $C^2$ extend the same way to the right of 1; the cost of $C^2$ cannot be less than the cost of $C^1$).

Start with the line 1 at $p_1$. The set of signatures is $\Sigma_1 = \{(p_1, \infty, 1)\}$, and the set of corresponding inactive covers is I $\{\{\}\}$. When 1 moves from $p_{j-1}$ to $p_j$, the sets of signatures and inactive covers is updated as follows. Let $\Sigma_{j-1}, I_{j-1}$ be the current sets, and $\Sigma_j, I_j$ be the new sets. For each signature $\sigma=(p_{i_1}, p_{i_2}, v) \in \Sigma_{j-1}$ and its corresponding inactive cover $C_1$, do:

1. Add $\sigma^1 = (p_{i_1}, p_{i_2}, v+1)$ to $\Sigma_j$, and $C_I^1 = C_I$ to $I_j$ (i.e., assume $p_j$ is not the endpoint of an active interval, so it stays unassigned).

2. If $p_j - p_{i_2} \geq e$ and $v+1 \geq k$, i.e. we can assign points to $[p_{i_2}, p_j]$ such that it is (k, e)-anonymous, then: —$p_{i_2} \neq \infty$, add $\sigma^2 = (p_{i_2}, \infty, V-k)$ to $\Sigma_j$, and $C_I^2 = C_I \cup \{[p_{i_1}, p_j]\}$ to $I_j$ (i.e. assume $p_j$ is the right endpoint of the leftmost active interval; this interval becomes inactive, and k points are assigned to it). If $p_{i_2} = \infty$, add $\sigma^3 = \{\infty, \infty, ()\}$ to $\Sigma_j$ and $C_I^3 = C_I \cup \{[p_{i_2}, p_j]\}$ to $I_j$ (i.e., assume $p_j$ is the right endpoint of the only active interval; this interval becomes inactive, and all points are assigned to it).

3. If $p_{i_2} = \infty$, (i.e. there was at most one active interval), then add $\sigma^1 = (p_{i_1}, p_j, v+1)$ to $\Sigma_j$ and $C_I^4 = C_I$ to $I_j$ (i.e., assume $p_j$ is the left endpoint of a new active interval).

Because there can be at most two active intervals at any time, the cases above generate all possible partial covers. A signature $\sigma \in \Sigma_{j-1}$ may generate multiple new signatures in $\Sigma_j$, if several of the above cases apply to it. At the end of the update step, $\Sigma_j$ may contain several identical signatures. Various embodiments "filter" $\Sigma_j$ and $I_j$ as follows: for any $\sigma, \sigma^1 \in \Sigma_j$, and corresponding $C_I, C_I^1 \in I_j$, such that $\sigma = \sigma^1$ and $\mu(C_I) \leq \mu(C_I^1)$, remove $\sigma^1$ from $\Sigma_j$ and $C_I^1$ from $I_j$.

When 1 goes past $p_n$, $I_{n+1}$ contains covers of P. Return the cover with minimum cost $\mu$, which is an optimal cover of P. The overall number of distinct signatures is $O(n^3)$. The running time is $O(n^4)$, since it sweeps 1 over n points, and at each position it updates $O(n^3)$ signatures. Each signature has a corresponding inactive cover of size $O(n/k)$, for a total space of $O(n^4/k)$. Thus, conclude with the following.

Theorem 4: Given a de-identified table D with one sensitive attribute S, various embodiments can compute an optimal (k, e)-anonymous partition of D under the max-of-error measure in $O(n^4)$ time and $O(n^4/k)$ space.

IV. Multiple Sensitive Attributes

The max-of-error model will be used. As discussed in Section V, the max-error is a better predictor of query accuracy than the sum-of-errors in the 1-dim. case, and it is reasonable to expect the same behavior in higher dimensions. However, sum-of-errors also may be used in other embodiments. This section refers to (k, e)-anonymous partitions without specifying whether the basic, advanced, or generalized model (recall Definition 2) is used. This is because various embodiments can apply to any of the three models. The difference appears in the running time, and as will be described below.

Let P be the set of distinct points $(p_1, \ldots, p_d)$ obtained by projecting the de-identified table D over the sensitive attributes $S_1, \ldots, S_d$. By Definition 3, an optimal (k, e)-anonymous partition of P, $P = \{P_1, P_2, \ldots\}$, is one that minimizes $\mu(P) = \max_i \text{diam}(P_i)$. For simplicity, refer to this problem as the minimum diameter problem, and call its associated cost function $\mu$ the diameter cost. This is similar to the problem of clustering to minimize the maximum cluster diameter, except that in this case the number of clusters is not known, and we have the (k, e)-conditions to take into account.

This section will refer to a related problem, which is called the minimum square cover problem: Define a (k, e)-anonymous cover of P by axis-parallel squares to be a set of squares $C = \{\sigma_1, \sigma_2, \ldots\}$, so that each $p \in P$ can be assigned to a square that covers it; and for each i, the subset Pi assigned to $\sigma_i$ is (k, e)-anonymous. The cost of C, which is called the square cost, is the largest side length of a square in C. The minimum square cover problem requires computing the cover that minimizes this cost. The square cost is the diameter cost under the $L\infty$ metric.

Not surprisingly, the minimum diameter problem, as well as certain approximations of it, are NP-Hard even for d=2. The proof is sketched below. More details are in the appendix.

Theorem 5: Computing the optimal partition under the max-of-error model for two sensitive attributes $S_1, S_2$ is NP-Hard. Moreover, computing a $(\sqrt{2}-\epsilon)$-approximate partition is also NP-Hard, for any $( ) < \epsilon < 1$.

Proof: Let $\mu^*$ be the minimum diameter of a (k, e)-anonymous partition of P. Let $\mu^*\infty$ be the minimum square cost of a (k, e)-anonymous cover of P by squares. Clearly, $\mu^*\infty \leq \mu^*$, since any set $P_i$ with diam$(P_i) \leq \mu^*$ has a bounding square of size at most $\mu^*$. Conversely, $\mu^* \leq \sqrt{2} \mu^*\infty$, since the diameter of a square of size $\mu^*\infty$ is at most $\sqrt{2} \mu^*\infty$. Various embodiments prove that it is NP-Hard to compute a $(2-\epsilon)$-approximate (k, e)-anonymous cover of P by squares, and the claim follows. The proof is by reducing 3SAT to a dual of the decision problem. In the following, two approximation algorithms for this problem are presented. For ease of presentation, assume only two sensitive attributes, i.e., d=2. At the end, various embodiments discuss how the algorithms extend to handle more attributes.

A. $(3+\epsilon)$-Approximation

Start with an algorithm that computes a $4\sqrt{2}$-approximate cover of P, then gradually refine it to obtain the $3+\epsilon$-approximation. The algorithm is quasi-linear for the basic and advanced models, but $O(n^2 \log^2 n)$ for the generalized model. Various embodiments will also use this framework in the next subsection, where it is shown how to decrease the running time for the generalized model to quasi-linear at the cost of generating slightly infeasible solutions.

1) $4\sqrt{2}$-approximation: A goal is to compute a (k, e)-anonymous cover of P by axis-parallel squares. Let $\mu^*\infty$ be the minimum square cost. Compute a square cover C of P of cost at most $4\mu^*\infty$. As in the proof of Theorem 5, this implies that the diameter cost of C is at most $4\sqrt{2}\mu^*$, where $\mu^*$ is the minimum diameter cost.

The optimal value $\mu^*\infty$ is the $L_\infty$ distance between two points of P. Thus, the binary search can be decomposed into two distinct searches, one over the set $M_x=\{p_ix-p_jx|p_i,p_j\in P\}$, and the other over $M_y=\{p_i,y-p_j,y|p_i,p_j\in P\}$, where $p_i,x,p_i,y$ are the x and y-coordinates of $p_i$. As before, represent each set as a matrix with sorted columns. The searches end with pairs of consecutive values $\mu_{1,x},\mu_{2,x}\in M_x$, and $\mu_{1,y},\mu_{2,y}\in M_y$, so that the decision procedure returns "no" on $\mu_{1,x},\mu_{1,y}$, and "yes" on $\mu_{2,x},\mu_{2,y}$. Return $\bar{\mu}=\min\{\mu_{2,x},\mu_{2,y}\}$, together with the corresponding cover. Since $\mu^*_\infty \in M_x \cup M_y$, it follows that $\bar{\mu}\leq\mu^*_\infty$. The cover computed by the decision procedure on $\mu$ has square cost at most $4\mu$, so the final cover has square cost at most $4\mu^*_\infty$.

The decision procedure is described in FIG. 13. It computes a cover of P by squares centered at points of P. Let $\sigma(p,\mu)$ be the square of center p and sidelength $2\mu$. Select squares $\sigma(p_i,\mu)$ greedily, and define the partition $P_i$ to be the points covered by $\sigma(p_i,\mu)$. Only squares for which $P_i$ is (k, e)-anonymous are selected. To avoid double-counting, each p is marked after it is first covered, and it cannot be assigned to any subsequent square. At the end, some points remain unassigned. Do a second pass and attempt to assign them by enlarging the size of the selected squares, up to a factor of 2. If this fails, the procedure returns "no." Note that this approach is similar to the one in FIG. 12, but the space dimensionality may force various embodiments to scan the points twice.

The running time of the procedure is dominated by the execution of Steps 5, 6, 8 and the loop 13-16. Various embodiments may provide an efficient way for computing all (marked and unmarked) points covered by a square. In addition, various embodiments check whether $P_i$ is (k, e)-anonymous. For the basic and advanced models, various embodiments compute $|proj_v(P_i)|$ (the e-condition will be trivial to check from the data structures we use to compute $|proj_v(P_i)|$, for a constant number of directions v. For the generalized model, check that width$(P_i)\geq e$. Computing the width takes O(n log n) time [1], which dominates the running time.

Various embodiments now describe a fast implementation for the basic model (the advanced model is similar). In a pre-processing step, compute a 2-level binary tree T on P. The first level is a binary tree on the x-coordinates of points in P. Each internal node v has an associated second-level tree $T_v$, which is a binary tree on the y-coordinates of the points in the subtree of v. The points of P are stored in the leaves of second-level trees. For each node w in a second-level tree, let $P_w \subset P$ be the points in the subtree of w. Store $|P_w|$ at w, as well as at most k distinct values in sorted order from $proj_1(P_w)$, and similarly for $proj_2(P_w)$ ($proj_1, proj_2$ are the projections on the coordinate axes). Also store a flag $Q_w$, indicating whether $P_w \subset Q$ (initially, $Q_w=0$). It is well known that for any square $\sigma$, the set $\sigma \cap P$ can be computed in $O(\log^2 n)$ time. The result is represented by $O(\log^2 n)$ nodes w in second level trees, so that $\sigma \cap P$ is the union of the sets $P_w$ associated with them. Execute Steps 5 and 8 in $O(\log^2 n)$, and Step 6 in $O(\min\{k \log^2 n, n\})$. In Step 5, only nodes w with $Q_w=0$ are taken into account. In Step 8, set $Q_w=1$ for all nodes w that represent $P_i$. Similarly, the loop in Steps 13-16 is executed in $O(n \log^2 n)$ time, and additional flags $Q_w$ may be set to 1. During the algorithm, also maintain $|Q| \Sigma_{w:Q_w=1}|P_w|$. The test in Step 20 takes O(1) time.

Lemma 2: Let $\mu^*_\infty$ be the minimum square cost of a cover of P. If $\mu \geq \mu^*_\infty$, the procedure $D_2(\mu)$ from FIG. 13 returns "yes," together with a (k, e)-anonymous cover of cost at most $4\mu$. Let $T(|P_i|)$ be the time to compute width$(P_i)$. The running time of $D_2(\mu)$ is $O(nk \log^2 n)$ for the basic and advanced models, and $O(n(T(n)+\min\{n,k \log^2 n\}))=O(n^2 \log n)$ for the generalized model.

Proof: The proof is by contradiction. Let $p_i \in (P\backslash Q)$ be an unmarked point at the end of Step 19. Let $\sigma^*$ be a square in an optimal cover of P such that $p_i \in \sigma^*$. See FIG. 14. Let $P^* \subset P$ be the points assigned to $\sigma^*$. Hence, $P^*$ is (k, e)-anonymous. Since $\mu \geq \mu^*_\infty, \{\sigma(p_i,\mu) \cap P\} \supset \sigma^* \supset P^*$. Then $\sigma(p_i,\mu) \cap P$ is also (k, e)-anonymous (width is monotonic). The test in Step 6 fails for $p_i$, as otherwise $p_i \in Q$ after Step 8. Therefore, by then $|Q \cap P^*| \geq 1$. Then there exists $q \in P^*$ and an iteration $r<i$ such that q was marked in Step 8 of iteration r. This means that the square $\sigma(p_r,\mu)$ is in C at the end of Step 10, and $q \in \sigma(p_r,\mu)$. But $\|p_i-p_r\|\infty \leq \|p_i-q\|\infty + \|q-p_r\|\infty \leq \mu^*+\mu^*+\mu \leq 2\mu$, which implies that the test $p_i \in \sigma(p_r,2\mu)$ in Step 14 succeeds, a contradiction.

Because of the tests in Step 6, and the fact that the partitions are disjoint (as insured by the way points are marked), it follows that each $P_i \in P$ is (k, e)-anonymous. The test in step 14 insures that each $P_i$ lies inside a square of size at most $2 \cdot 2\mu = 4\mu$.

Remark 1: A 4-approximate partition under diameter cost can be obtained by replacing the squares $\sigma(p_i,\mu)$ with disks $D(p_i,\mu)$. The running time remains the same. The less accurate algorithm is described, since it facilitates explanation of subsequent improvements.

2) $(3\sqrt{2}+\epsilon)$-approximation: The proof of Lemma 2 shows that two different approximations contribute to the factor of 4. First, centering squares at points contributes a factor of 2. An additional factor of 2 comes from choosing squares greedily. The greedy approach is faster than more sophisticated methods, and various embodiments keep it. To decrease the overall error, discard the centered squares. Instead, define CS to be the set of anchored squares, i.e., squares that contain an input point on their left and lower sides. The reason for this is that there exists an optimal cover of P with only anchored squares Oust shift each optimal square up and to the right until it is anchored). Let $(p, q, \mu)$ denote an anchored square of size $\mu$ with p on its left side and q on its bottom side. Replacing centered squares by anchored squares would result in a cover of square cost $3\mu^*_\infty$. A drawback is that the loop in Step 2 would have $O(n^2)$ iterations, and the running time becomes $O(n^3)$.

Figure 15:
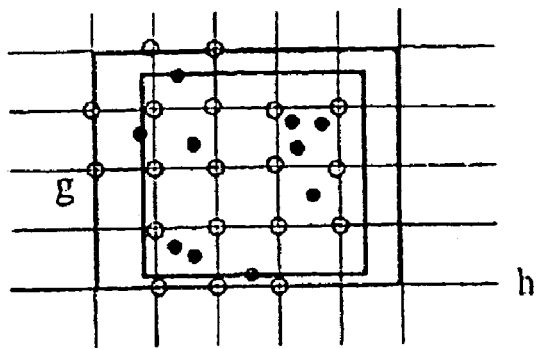
FIG. 15 illustrates computing grid points (empty circles) from original points (filled circles), and anchoring a square on the grid according to various embodiments.
Figure 16:
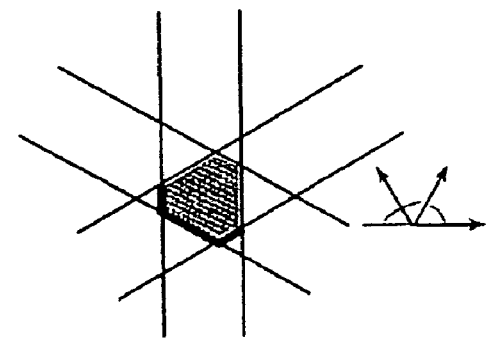
FIG. 16 illustrates a 3-canonical polygon (hashed region) where lower sides are emphasized according to various embodiments.

Instead, compute a cover of square cost $(3+\epsilon)\mu^*_\infty$ (and diameter cost $(3\sqrt{2}+\epsilon)\mu^*$) by putting a grid on the plane, and anchoring squares to grid points that are close to the original points. Various embodiments prove that in this case it suffices to consider $$O\left(\frac{n}{k\epsilon}\right)$$

anchored squares. Let $\bar{\mu}<4\mu^*_\infty$ be the value returned by the approximation algorithm from Section IV-A.1, and let $0<\epsilon<1$. Draw horizontal and vertical grid lines with grid step $v=\epsilon \bar{\mu}/4 \leq \epsilon \mu^*_\infty$. Let G be the set of grid points that are within $L_\infty$-distance v of a point $p \in P$. See FIG. 15. The following result is immediate from the construction.

Proposition 2: Let $\sigma^*$ be a square in an optimal square cover of P. Then there exist two (possibly identical) grid points $g1 \cdot g2 \in G$ such that $\sigma^*$ is contained in the square anchored in $g_1$ and $g_2$, and of size $(1+\epsilon)\mu^*_\infty$. The number of grid points within distance v of some point in $P \cap \sigma^*$ is $O(1/\epsilon^2)$.

Proposition 2 shows that various embodiments can use grid-anchored squares in the algorithm, with only a small error. It also implies that $|G|=\overline{O}(|C^*|/\epsilon^2)$, where $|C^*|$ is number of squares in an optimal cover $C^*$. Because of the k-condition $|C^*|\leq n/k$. However, various embodiments do not need to consider $|G|^2$ anchored squares. Instead, note that if $g_1$ and $g_2$ are two grid points on the same horizontal line, i.e., $g_1 \cdot y = g_2 \cdot y$, then for any grid point g, $(g \cdot g_1 \cdot \mu) = (g \cdot g_2 \cdot \mu)$. Hence, for each choice of g as a left anchor, various embodiments only need to consider distinct horizontal grid lines h as bottom anchors. Thus, denote an anchored square by $(g, h, \mu)$. However, various embodiments can insure that for each line h, there exists at least one grid point $g_1 \in h$ such that $g_1 \cdot x - g \cdot x \leq \mu$ (otherwise, no square of size $\mu$ can be anchored in g and a point of h). Check this condition by sorting the grid points that lie on h by their x-coordinates, and comparing the ranks of $g^x$ and $g^x + \mu$ in this order. Finally, bound the number of horizontal lines considered for each g by noting that the vertical distance between g and h must be at most $\mu$. Hence, various embodiments can consider $$\Theta\left(\frac{\mu}{\epsilon\mu^*}\right)^*$$

horizontal lines. Since various embodiments have already computed $\overline{\mu}$ such that $\mu^* \in [\overline{\mu}/\sigma,\overline{\mu}]$, restrict the binary search to this interval, so $$\Theta\left(\frac{\mu}{\epsilon\mu^*}\right) = \Theta(1/\epsilon).$$

The last modification to the procedure in FIG. 13 is for Step 12: an anchored square $(g, h, \mu)$ is replaced by $(g-\mu, h-\mu, 3\mu+v)$, where $g-\mu$ is the point $(g, x-\mu, g, y)$, and $h-\mu$ is the horizontal line at distance $\mu$ below h. Conclude with the following lemma, whose proof is similar to that of Lemma 2.

Lemma 3: Let $\mu^*_\infty$ be the minimum square cost of a cover of P. Compute a (k, e)-anonymous square cover C of P of cost at most $(3+\epsilon)\mu^*_\infty$ in time $$O\left(\frac{n\log^2 n}{\epsilon}\right)$$

for the basic and advanced models, and $$O\left(\frac{n^2\log^2 n}{k\epsilon}\right).$$

for the generalized model. The diameter cost of C is $(3\sqrt{2}+\epsilon)\mu^*$, where $\mu^*$ is the minimum diameter cost.

3) $(3+\epsilon)$-approximation: The previous algorithm achieves a $(3+\epsilon)$-approximation with respect to square cost, but its error increases by a factor of $\sqrt{2}$ for the diameter cost. This is because the diameter of a square is a factor of $\sqrt{2}$ larger than its side. To obtain a tighter approximation for the diameter cost, replace squares by polygons as defined below. The main ideas are described below. The proofs follow similar arguments to the case of squares.

Definition 5: An r-canonical polygon R of size $\mu$ is the (non-empty) intersection of r strips, each of width $\mu$, such that one of the strips is vertical, and the directions of the strips form a uniform grid over $[0,\pi]$. A side s of R is a lower side if the polygon R lies in the positive halfspace with respect to the line through s. If R contains a point of P on each of its lower sides, say that R is anchored. An anchored square is a 2-canonical polygon, of size equal to its side length. An example of a 3-canonical polygon is shown in FIG. 12(a). The following result bounds the error of approximation by canonical polygons, under the diameter cost. The proof uses elementary trigonometry, and can be found in [11].

Proposition 3: For any set of points P and for any $r \geq 2$, there exists an r-canonical polygon R of size diam(P) such that $P \subset R$ and R is anchored. Conversely, if P is an arbitrary point set inside an r-canonical polygon R of size $\mu$, then $$diam(P) \leq \frac{a}{1-(\pi^2/8r^2)}.$$

Define an r-polygonal cover of P to be a set $C=\{R_1, R_2, \ldots\}$ of anchored r-canonical polygons that cover P, so that each $p \in P$ can be assigned to a polygon that covers it; and for each i, the subset $P_i$ assigned to $R_i$ is (k, e)-anonymous. The cost of the cover, which is called the r-polygonal cost, is the maximum size of a polygon in C. Let $\mu^*_r$ be the minimum r-polygonal cost, and $\mu^*$ be the minimum diameter cost. For $$r = \frac{\pi}{\sqrt{\epsilon}},$$

Proposition 3 implies that $$\mu^*_r \leq \mu^* \leq \mu^* \leq \frac{1}{1-\epsilon/t}\mu^*_r \leq (1+\epsilon)\hat{\mu}^*_r.$$

Represent a polygon R of size $\mu$ as $(p_1, \ldots p_r, \mu)$, where $p_1, \ldots p_r$ are its anchors. As before, first compute $\mu \leq 4\sqrt{2}\mu^*$, then draw a grid and anchor the polygons in grid points and grid lines. A difference is that various embodiments now compute grid lines in each of the r directions. Similarly, in Step 12 from FIG. 13, a polygon is extended in all r directions. The data structures are also extended: instead of a 2-level binary tree, use an r-level binary tree. Finally, modify the main binary search that calls the decision procedure. Recall that in Sections IV-A.1 and IV-A.2 the search was over the sets $M_x$ and $M_y$. Now search over r sets, each representing the distances between points along the vectors $v_1, \ldots, v_r$ orthogonal to polygon sides. The cover C thus computed has r-polygonal cost at most $(3+\epsilon)\mu^*_r$. By Proposition 3, and for $r=\Theta(1/\sqrt{\epsilon})$, the diameter cost of C is at most $(3+\epsilon)(1+\epsilon)\mu^* \leq (3+5\epsilon)\mu^*$. Running the algorithm with $\epsilon/5$ instead of $\epsilon$ results in the desired approximation. Thus, conclude with the following.

Theorem 6: Let $\mu^*$ be the minimum diameter cost for a partition of P. Various embodiments can compute a (k, e)-anonymous partition of $$P \text{ of cost } (3+\epsilon)\,\mu^* \text{ in time } \frac{n\log^2 n}{\epsilon^{O(1/\epsilon)}}$$

for basic/advanced models, and in time $$\frac{n^2\log^2 n}{k\varepsilon^{O(1/\varepsilon)}}$$

for the generalized model.

B. Linear Time Approximation

For the generalized model, various embodiments can reduce the running time from Theorem 6 by a factor of n, at the price of computing a slightly infeasible solution. More precisely, the computed partition is only guaranteed to have width $(1-\epsilon)\epsilon$. Note, however, that while parameter k has a clear meaning and is easy to fix, parameter e is an educated guess. A database administrator who wishes to anonymize a table will likely choose a larger value than necessary, to err on the safe side. Thus, the solution generated by various embodiments is a good compromise for large tables.

Eliminate the exact computation of the width of a set, i.e., $T(n)=O(n \log n)$ from Lemma 2. Instead, rely on an estimate of the width, using the $\epsilon$-kernel framework [1]. The $\epsilon$-kernel of P is a subset $K \subset P$ such that width(K)$\geq$(1−$\epsilon$)width(P). Any set has an $\epsilon$-kernel of size $O(1/\sqrt{\epsilon})$ which can be computed in $O(n+1/\epsilon^{3/2})$. In addition, if $Q_1$ and $Q_2$ are $\epsilon$-kernels for sets $P_1$, resp. $P_2$, then $Q_1 \cup Q_2$ is an $\epsilon$-kernel of $P_1 \cup P_2$. Various embodiments can compute a hierarchy of $\epsilon$-kernels, using the 2-level binary tree, as follows.

Various embodiments can explain how to modify the algorithm for computing square covers. The extension to polygonal covers follows the same steps as above. The overall approach is the same: first compute a cover by centered squares, then refine it to a cover by squares anchored at grid points. Recall that for both phases, various embodiments use a 2-level binary search tree, which is computed in a pre-processing step. Each second level node w in the tree is associated with the points $P_w$ stored in the leaves of its subtree. Various embodiments compute an $\epsilon$-kernel Kw of $P_w$ and store it at w. There are $O(n \log n)$ second-level nodes w, so the computation of all kernels takes time $O(\Sigma_w |P_w|+n \log n/\epsilon^{3/2})=O(n \log n/\epsilon^{3/2})$. In Step 5 of FIG. 12, when computing the nodes w that represent $P_i$, various embodiments also compute $K_i=\cup_w K_w:|K_i|=O(\log^2 n/\sqrt{\epsilon})$. Various embodiments then compute width($K_i$) in $O(|K_i| \log K_i|)$ time. Instead of testing whether width($P_i$)$\geq$e, test whether width(K) $\geq$(1−$\epsilon$)e. Various embodiments then extend this approach to computing polygonal covers. Omitting all details, conclude with the following.

Theorem 7: Let $\mu^*$ be the minimum diameter cost for a partition of P. Various embodiments can compute a (k, (1−$\epsilon$) e)-anonymous partition of P under generalized model of cost $(3+\epsilon)\mu^*$ in time $$\frac{n\log^{O(1/\varepsilon)} n}{\varepsilon^{O(1/\varepsilon)}}.$$

Extension to higher dimensions The decision procedure from FIG. 13 extends to higher dimensions by replacing a square with a hypercube. Similarly, an r-canonical polygon is replaced by an r-canonical polyhedron, defined as the intersection of r hyperstrips. The vectors $v_1, \ldots, v_r$ orthogonal to the hyperstrips form a uniform grid over the unit sphere $S^{d-1}$. For $r=O^*1/\epsilon^{d-1/2}$, the diameter of the r-canonical polyhedron is at most $(1+\epsilon)$ larger than its size [1]. Computing the width takes $O(n^{d-1})$ time, and computing an $\epsilon$-kernel requires $O(n+1/\epsilon^{3(d-1)/2})$ time [1]. Theorems 6 and 7 extend to d dimensions by replacing the $O(1/\epsilon)$ terms in the running time with $O(d/\epsilon)$; additionally, in Theorem 6, $n^2$ becomes $n^d$.

V. Experimental Evaluation

The following Experiments shall be regarded as merely illustrative and shall not be construed as limiting the invention.

Experiments were conducted on real data from a large enterprise system, which stores device measurements over time. Each tuple contains a unique (integer) id of the device, a time stamp, and several measurements taken for the device at that particular time stamp. Various embodiments project each tuple on the attributes (ID, tstamp, Val) (where Val is one type of measurement), and use this dataset in the experiments. Various embodiments can provide very fast approximation algorithms for one sensitive attribute. Therefore, evaluation was performed as to how well various embodiments scale for a real application with large amounts of data. The measurement dataset selected was recorded in June 2008, and has a total of $O(10^7)$ tuples. Because of the quadratic behavior of previous proposed methods, it would have been infeasible to anonymize such a dataset before. To compare various embodiments with previous techniques, smaller subsets of the data containing $O(10^5)$ tuples, were also selected. To preserve meaningful correlations, tuples are not arbitrarily chosen: Rather, various embodiments randomly choose a suitably small subset of id's I, and take all tuples with id in I and with time stamps inside a fixed time interval.

Four methods are compared, as follows: OptSum is the exact algorithm for minimizing sum-of-error, which requires $O(n^2)$ time, as described in [14]; GreedySum and GreedyMax are those described in FIGS. 8, resp. 6; and Max2 is a binary search algorithm that uses the decision procedure described in FIG. 12. However, the approach described in Section III-B.2, which requires the non-trivial machinery of searching in a sorted matrix, is modified. Instead, first run GreedyMax to obtain a value $\bar{\mu}$, then do a binary search over the interval [$\bar{\mu}/3$, $\bar{\mu}$], which is guaranteed to contain the optimal value by Theorem 2. The binary search repeatedly halves the current interval, until its length is less than the distance between the two closest sensitive values. This approach also guarantees a 2-approximation. However, the number of iterations no longer depends on n, and may be much larger than $O(\log n)$ for certain distributions. In practice, expect the number of iterations to be small. For the largest datasets in the experiment, Max2 calls the decision procedure about 10 times. Finally, note that the evaluation did not implement the exact algorithm for max-of-error, as its running time of $O(n^4)$ makes it impractical even for small datasets.

Scalability

Figure 17A:
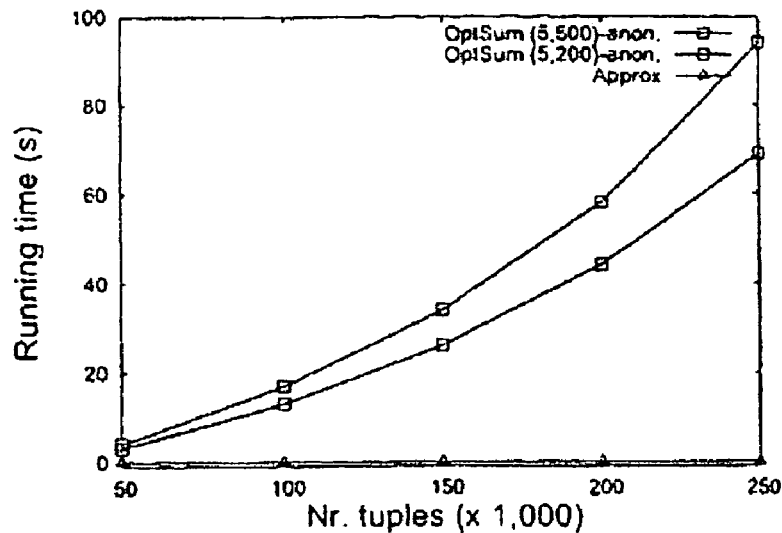
FIGS. 17A and 17B illustrate scalability of approximation methods: comparison with OptSum over small datasets and large datasets, respectively, according to various embodiments.

Compare the relative performance of various embodiments to that of OptSum over smaller datasets. The results in FIG. 17A illustrate the quadratic behavior of OptSum. By contrast, the other three methods are extremely fast: each one takes less than 0.1 seconds. For better visibility, the label 'Approx' is used on the graph to denote any one of them. Note that the running time of OptSum depends on the value of e. This is because various embodiments implemented a pruning technique in OptSum, using precomputed canonical intervals to reduce the number of candidate intervals considered during each step of the dynamic program. The less restrictive the (k, e)-anonymity conditions, the more candidate intervals. Hence, when e decreases, the running time increases (the effect of decreasing k was negligible). By contrast, the running times of GreedySum and GreedyMax are independent of k and e, as is the time for the decision procedure in Max2.

Figure 17B:
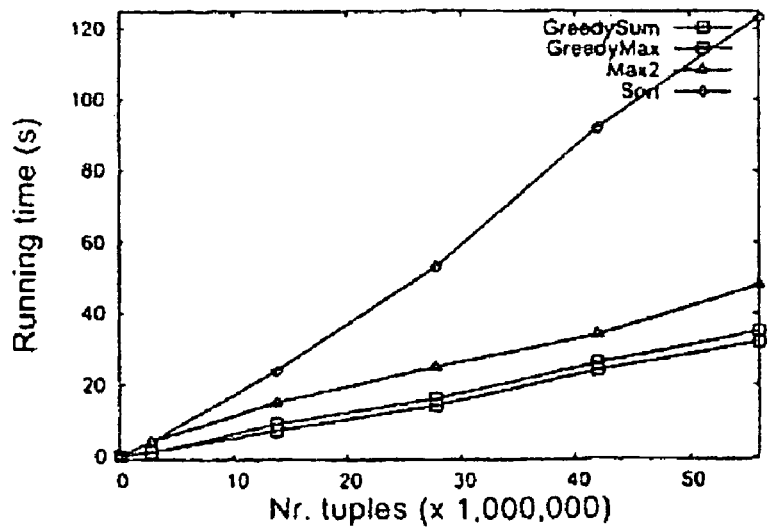

FIG. 17B shows how each of the three approximation methods scales over large datasets. The graphs do not include the time to sort the data, which is reported separately. As expected, the sorting time becomes dominant as the number of values increases. However, even when the data has to be sorted, the approximation methods require about the same time (i.e., $O(10^2)$ seconds) as OptSum needed for a dataset two orders of magnitude smaller.

None of the reported running times includes the permutation time, which takes place after a partition is computed. Permutation can be done in linear time, using the well known Knuth shuffle. For all the datasets, permutation time was approx. 75% of the running time for a linear partitioning algorithm (i.e., GreedySum or GreedyMax).

B. Interval Statistics

Figure 18A:
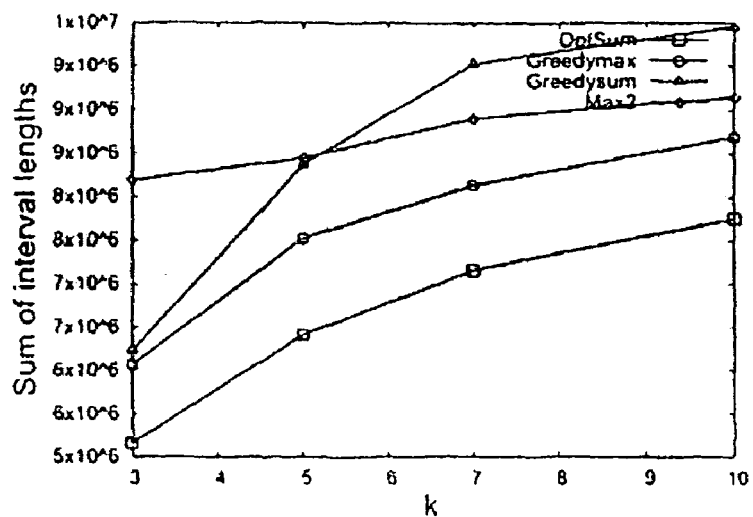
FIGS. 18A-18C illustrate dependence of optimal and approximate solutions on k, e=500 for sum of interval lengths, maximum interval length, and nr. intervals, respectively, according to various embodiments.
Figure 18B:
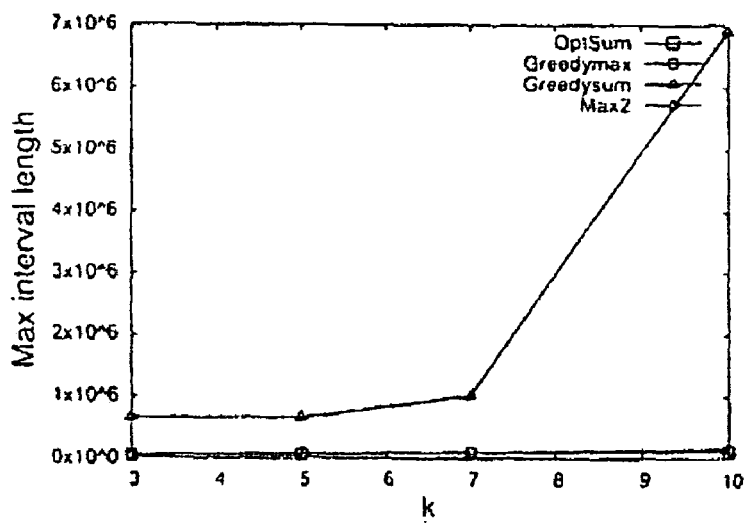
Figure 18C:
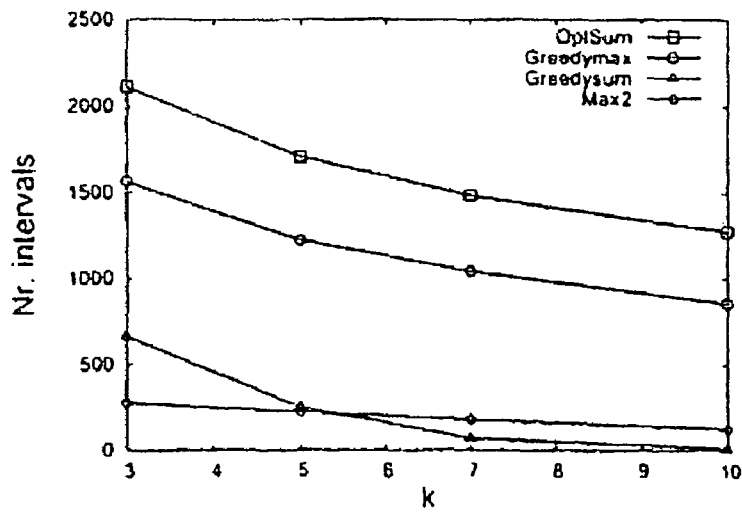
Figure 19A:
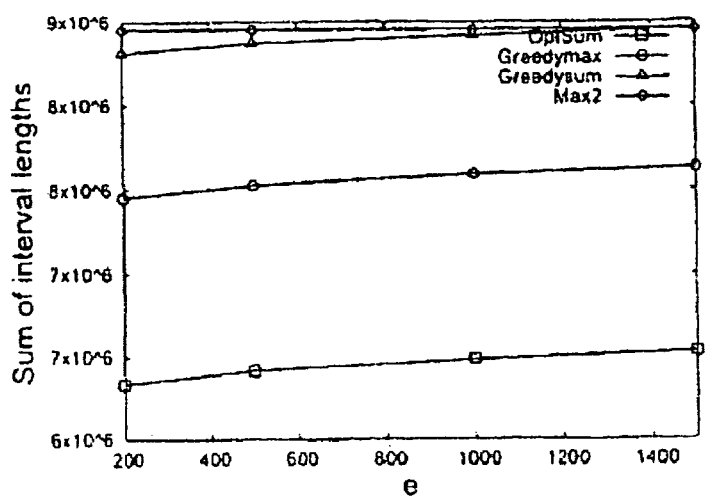
FIGS. 19A-19C illustrate dependence of optimal and approximate solutions on e; k=5 for sum of interval lengths, maximum interval length, and nr. intervals, respectively, according to various embodiments.
Figure 19B:
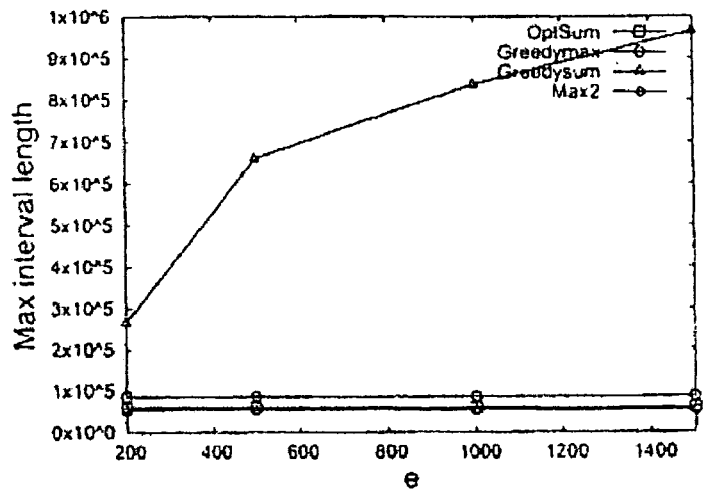
Figure 19C:
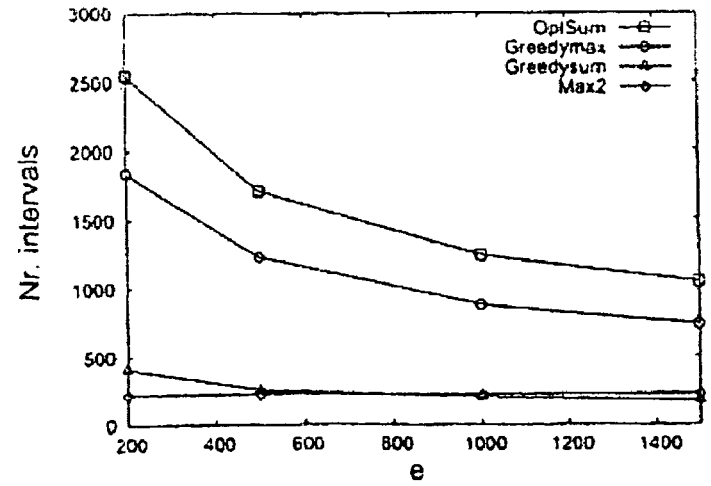

The results reported in the remainder of this section are for a dataset of 200 k measurement tuples. Since all four methods generate the same type of output, i.e., sets of intervals, it is natural to compare all of them under both the sum and max measures, even though OptSum and GreedySum minimize sum-of-error, while Greedymax and Max2 minimize the maximum error. FIG. 18A, resp. FIG. 19A, plot the sum of interval lengths for each solution, as a function of k, resp e. Similarly, FIGS. 18B and FIG. 19B show how the maximum interval length is influenced by k, resp. e, for each method. The graphs in FIG. 18 fixed e=500, while graphs in FIG. 19 fixed k=5.

One trend from these four graphs is that Greedy-Sum performs worst under either measure. However, note that for sum, GreedySum is generally competitive with Max2, and within 1.5 of the optimal value computed by OptSum (thus, better than the theoretical 2-approximation bound). The most surprising result is that GreedyMax, which does not optimize for sum, is significantly better than GreedySum. To understand what happens, compare Steps 5-6 of GreedySum and GreedyMax (refer to FIGS. 8 and 10). The comparison in Step 5 of GreedySum uses upper bound length($I(p_i)$), while GreedyMax uses the larger upper bound 2length($I(p_i)$). However, the crucial difference appears to be that GreedySum looks at the distance between two consecutive points $p_{i-1}$, and $p_i$, while GreedyMax looks at the difference between $p_i$ and the left endpoint of the current interval. This must be to the left of $p_{i-1}$, and significantly so (there are at least k points and a distance of e between $I_c$.1 and $p_i$). Thus, Step 6 of GreedySum is more likely to be executed than Step 6 of GreedyMax. The effect is that, for GreedySum, as long as a range of the sensitive attribute is reasonably dense (i.e., consecutive values are close), it will be covered by only one interval, which keeps "stretching" to the right. This also explains why GreedySum is much worse under the max measure, as well as the fact that it tends to use fewer intervals than the other methods; see FIGS. 18C and 19C. Of course, the larger the values of k and e, the longer the canonical intervals $I(p_i)$, and the more likely is the test in Step 5 to succeed.

Another somewhat surprising trend is that OptSum is competitive under max measure with GreedyMax and Max2, and thus competitive (within a factor of 2) with the minimum maxerror solution. However, this is mostly a characteristic of the data itself, rather than algorithmic choices.

C. Utility: Query Accuracy

Compare the relative errors of the permuted tables generated by the four algorithms, under various aggregate query loads. The experiments are run on a dataset of 200K tuples, for (5, 500)-anonymization. Two types of queries are issued: (1) compute sum(Val) for tuples with time stamp in a given range; and (2) compute sum(Val) for tuples with ID in a given range. Compute the relative error of a query as rel(Q)=|Val$_o$(Q)−Val$_p$(Q)|/Val$_o$(Q), where Val$_o$(Q), resp. Val$_p$(Q), is the return value of query Q, when asked over the original, resp. permuted, data.

For the first type of queries, various embodiments expect that if the time range is small, many of the selected values Val corresponding to the same ID are close to each other. Therefore, expect those sensitive values to be grouped together in any partition. Even though the aggregate query may touch several groups, it is likely to touch many or all values in each group, so the resulting errors caused by permutation would be small. If the time range is large, select a large percentage of tuples, so the errors are also likely to be small, because the effects of permutation are minimized by high selectivity.

Figure 20A:
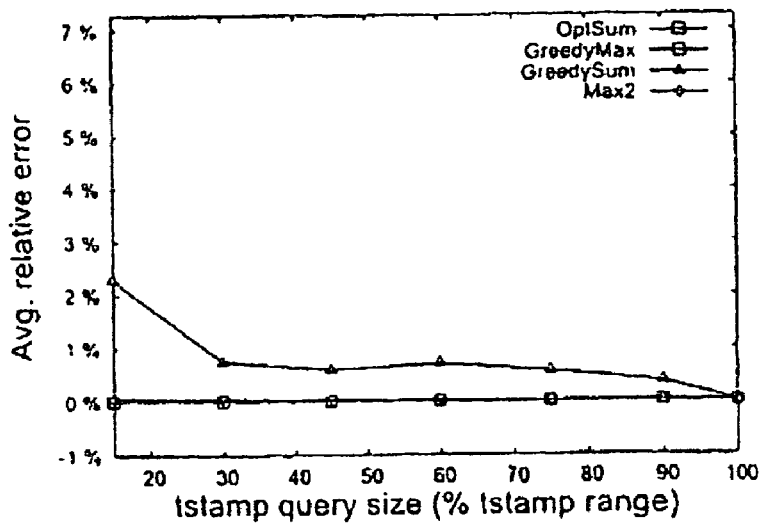
FIGS. 20A-20C illustrate query accuracy for range queries over ID and tstamp for tstamp queries, ID queries, and largest errors for ID queries, respectively, according to various embodiments.
Figure 20B:
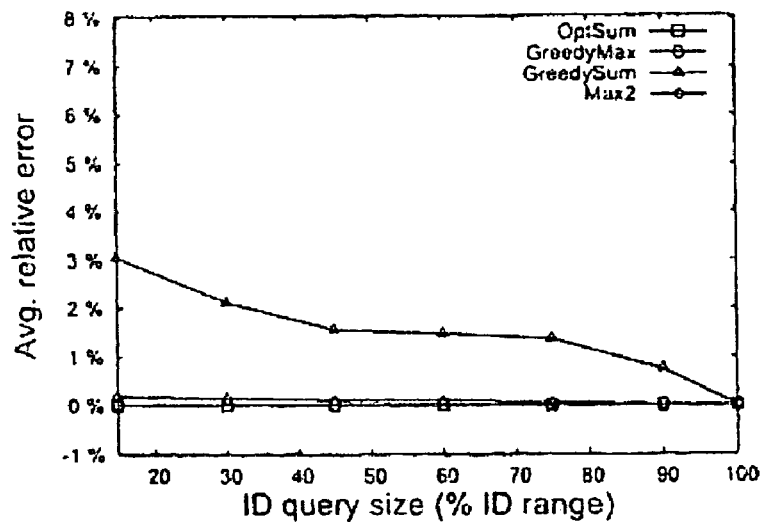
Figure 20C:
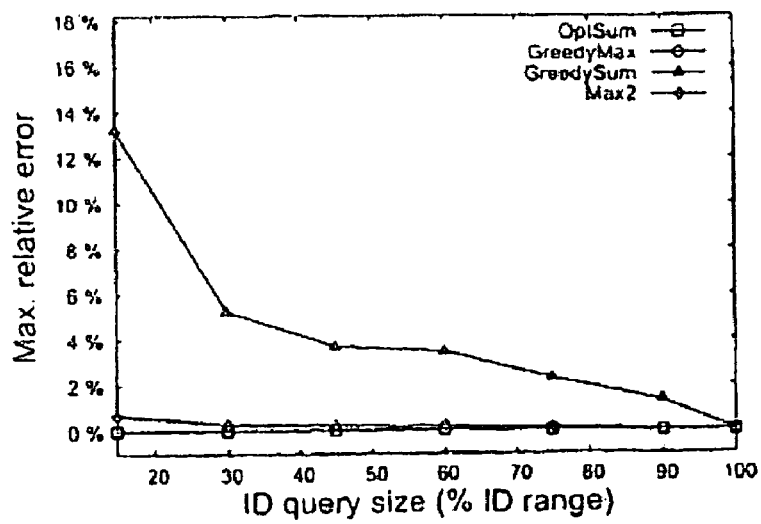

On the other hand, various embodiments do not expect the IDs to be in any way correlated to Val. Queries with large ID ranges are still expected to have small relative errors, because they select a large percentage of sensitive values. However, queries with small ID ranges probably touch only a few sensitive values in different partition groups. Such queries are the most likely to produce errors, and most indicative of the quality of the partition. The graphs in FIGS. 20A and 20B show the relative errors for the two types of queries, and for various range sizes. Each point on a graph represents the average relative error of 100 queries, all having the same range size, but different endpoints of the range conditions. For a fixed range size, the same 100 ranges are used for all four methods. As expected, the error goes down as the range increases. Not surprisingly, partitions generated by GreedySum have the highest errors. FIG. 20C plots the maximum relative error, rather than the average, for the corresponding 100 queries. Due to lack of space, this is shown only for ID ranges. Similar trends occur for tstamp ranges. With the exception of GreedySum, all methods achieve very low error rates, and are consistent (i.e., worst and average errors are similar). GreedySum has higher errors, and is much more inconsistent. This correlates tightly with the fact that the maximum interval length in GreedySum is significantly higher than for the other methods, as noted above. By contrast, the sum of interval lengths does not appear as tightly correlated with the errors, since Max2 has high sum, but small errors.

The experiments conclude that the max-error measure is a better predictor of the query accuracy for the permuted data. Of the three methods that achieve small max interval lengths, i.e. OptSum, GreedyMax, and Max2, note that GreedyMax is the fastest and most scalable. It also achieves high query accuracy, making it the method of choice for (k, e)-anonymization according to various embodiments.

VI. Conclusions

When microdata needs to be released, it is important both to protect privacy of individuals and to ensure utility for ad hoc analyses. Various embodiments have focused attention on the important case of numerical sensitive attributes, and the need to support complex aggregate queries over one or more sensitive attributes. Various embodiments have presented a geometric extension of (k, e)-anonymity as a suitable privacy goal in such scenarios, and present efficient algorithms for several criteria to optimize accurate answering of aggregates queries. Table anonymization algorithms according to various embodiments demonstrate that it is practical to achieve both privacy and utility over large databases.

References

[1] P. K. Agarwal, S. Har-Peled, and K. R. Varadarajan. Approximating extent measures of points. *JACM*, 51(4):606-633, 2004.

[2] N. Adam and J. Wortman. Security-Control Methods for Statistical Databases: A Comparative Study. *ACM Computing Surveys*, 21(4), 1989.

[3] R. J. Bayardo and R. Agrawal. Data Privacy through Optimal k-Anonymization. In *IEEE Intl. Conf. on Data Engineering*, Tokyo, Japan, April 2005.

[4] S. Doddi, M. V. Marathe, S. S. Ravi, D. S. Taylor, and P. Widmayer. Approximation algorithms for clustering to minimize the sum of diameters. *Nordic J. of Computing*, 7(3):185-203, 2000.

[5] G. N. Frederickson and D. B. Johnson. Finding kth paths and p-centers by generating and searching good data structures. *SIAM J. Computing*, 13:14-30, 1984.

[6] R. Ge, M. Ester, W. Jin, I. Davidson. Constraint-driven clustering. In *ACM SIGKDD*, 2007.

[7] A. Glozman, K. Kedem, and G. Shpitalnik. On some geometric selection and optimization problems via sorted matrices. In *Intl. Workshop on Algorithms and Data Structures*, pages 26-37. Springer-Verlag, 1995.

[8] N. Li, T. Li, and S. Venkatasubramanian. t-Closeness: Privacy Beyond k-Anonymity and l-Diversity. In *IEEE Intl. Conf. on Data Engineering*, 2007.

[9] A. Machanavajjhala, J. Gehrke, D. Kifer, and M. Venkitasubramaniam. l-Diversity: Privacy Beyond k-Anonymity. In *IEEE Intl. Conf. on Data Engineering*, Atlanta, Ga., April 2006.

[10] N. Megiddo and K. J. Supowit. On the complexity of some common geometric location problems. *SIAM J. Computing*, 13:182-196, 1984.

[11] C. M. Procopiuc and D. Srivastava. Efficient Table Anonymization for Aggregate Query Answering (full version). www.research.att.com/magda/papers/anonymity.pdf.

[12] L. Sweeney. Guaranteeing Anonymity When Sharing Medical Data, the Datafly System. *Journal of the American Medical Informatics Association*, pages 51-55, 1997.

[13] X. Xiao and Y. Tao. Anatomy: Simple and Effective Privacy Preservation. In *Intl. Conf. on Very Large Data Bases*, Seoul, Korea, September 2006.

[14] Q. Zhang, N. Koudas, D. Srivastava, and T. Yu. Aggregate Query Answering on Anonymized Tables. In *IEEE Intl. Conf. on Data Engineering*, 2007.

VII. Appendix

It is sufficient to prove that basic anonymity is NP-Hard, which implies that advanced and generalized anonymity are also NP-Hard. Given the tight correlation between square covers and basic anonymous partitions, various embodiments prove that it is NP-Hard to compute a $(2-\epsilon)$-approximation for a basic (k, e)-anonymous cover of P by squares. This implies that it is NPHard to compute a $(\sqrt{2}-\epsilon)$-approximation for a basic (k, e)-anonymous partition of P. In the following construction, set e=0, so the e-condition is always true.

Figure 21A:
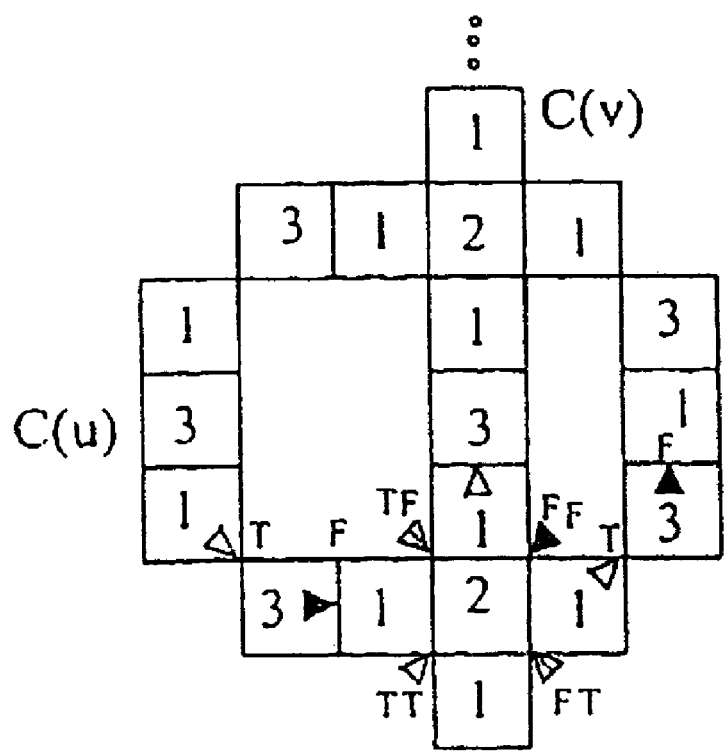
FIG. 21A-21B illustrate reduction from 3SAT for circuits and junction and clause construction for v+w+$\bar{u}$, respectively, according to various embodiments.
Figure 21B:
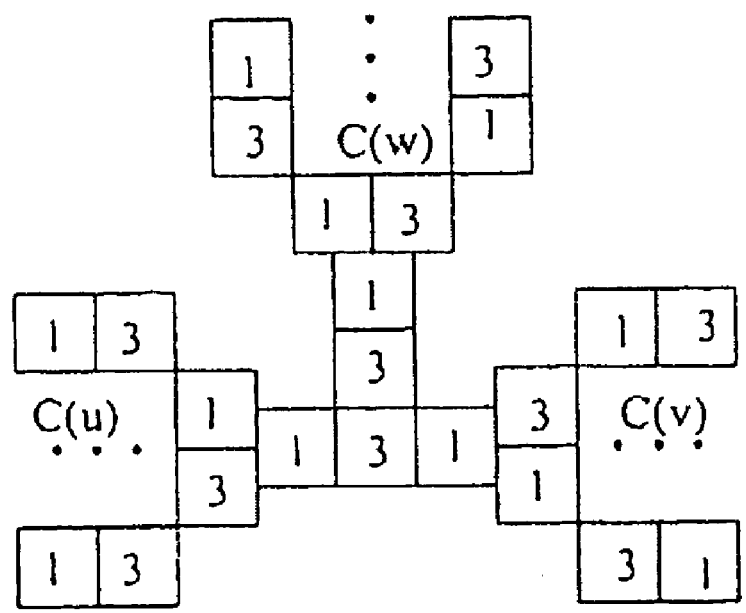

For ease of presentation, first define a simplified version of the square cover problem: require each square to have k total points assigned to it, but the projections of those points along each axis need not contain k distinct values. Various embodiments prove that this simplified problem is NP-Hard. The construction used for this purpose can easily be adapted to the basic (k, e)-anonymous square cover, and the modifications are discussed at the end. The idea is to reduce 3SAT to the decision problem for the dual of the simplified square cover, defined as follows: Given a set of unit squares, is there a set of points that intersect ("hit") the squares, so that each square is hit exactly once, and each point hits at least k=4 squares? The construction and proofs follow closely those in [10]: Represent each literal in an instance of 3SAT by a circuit of unit squares as in FIG. 21A. A truth assignment corresponds to one of two ways of hitting the squares: by points on odd-even edges, or by points on even-odd edges. Circuits intersect by sharing a square which has odd number in both. A clause in the original construction was represented by a square, which intersected either an odd-even or an even-odd edge in the circuits of its literals, depending on whether the literals appeared negated or not in the clause. Slightly modify the circuits and junctions as follows: each odd-numbered square in a circuit actually represents 3 input squares, sitting "on top of each other" (call this a stack of squares). The only exception is a junction square, which represents only 2 input squares. This modification is made to insure that circuits don't "jump" the odd-even or even_odd order at ajunction (the conditions in the original construction made this impossible, but not in the present case). The main modification is the clause construction from FIG. 21B: represent a clause by 5 geometric squares, instead of one, as in the original construction. The "outside" squares touch the literal circuits as before, depending on whether the literal is negated or not. Each inside square represents 3 actual squares. The modification allows various embodiments to claim that, for any pair of nonintersecting squares, the $L\infty$ distance of their centers is at least 2. Thus, even if various embodiments increase the size of each square by a factor $2-\epsilon$, $0<\epsilon<1$, the intersections among squares remain the same. As long as the intersections among squares do not change, an argument very similar to that in [10] shows that 3SAT is satisfiable if and only if the (enlarged) set of squares can be hit. It follows that the simplified square cover problem is NP-Hard, and so is computing a $(2-\epsilon)$-approximation for it.

In constructing an instance for the dual problem above, various embodiments used squares that sit "on top of each other" in a stack. Going back to the primal problem, this translates into having several points that are geometrically identical (i.e., the centers of the stacked squares). A point that hits four squares in the dual corresponds to a square that covers four points in the primal. However, since in the primal two or more points are geometrically identical, their projections on the coordinate axes are not distinct. Hence, the square cover does not satisfy the k-condition of the basic anonymity problem, so the construction does not imply that basic anonymity is NPHard. To remedy this, modify the construction as follows: First, for each set of squares in a stack, very slightly shift their centers, so that all centers have distinct x- and y-projections. Then, slightly shift the squares adjacent to a stack, so that their centers are not horizontally or vertically aligned with any center of a stack square, and so that all intersections among squares are exactly preserved. Since all intersections between squares are preserved, it still follows that 3SAT is satisfiable if and only if all squares can be hit. In the primal, such a hitting set corresponds to a square cover, but now this cover is basic (4, 0)-anonymous. This implies that basic anonymity is NP-Hard. Moreover, it can still be argued that it is NP-Hard to compute a $(2-\epsilon)$-approximation for basic anonymous square covers, for any $0<\epsilon<1$: When shifting squares, various embodiments can insure that for any pair of non-intersecting squares, the $L\infty$ distance of their centers is at least $2-\epsilon/2$. Then, enlarging the squares by a factor of $2-\epsilon$ does not change the intersections between squares.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation, the scope of the invention being set forth in the following claims.

What is claimed is:

1. A computer program product for anonymizing a database that includes a plurality of tuples, a respective one of the plurality of tuples including at least one quasi-identifier and a plurality of sensitive attributes associated with the respective one of the plurality of tuples, the computer program product comprising a non-transitory computer readable storage medium having computer readable program code embodied in the non-transitory computer readable storage medium, the computer readable program code comprising:

computer readable program code that is configured to partition the plurality of tuples into groups, a respective group including at least k different values of a linear combination of at least two of the plurality of sensitive attributes, where k is at least two, and a corresponding distance range of the linear combinations of the at least two of the plurality of sensitive attributes that is at least e, where e is greater than zero, to provide a (k,e)-anonymous partition of the database that includes the plurality of sensitive attributes;

computer readable program code that is configured to permute as units, the at least two sensitive values in the respective groups of the (k,e)-anonymous partition of the database that includes the plurality of sensitive attributes, to provide a (k,e)-anonymous permutation of the database that includes the plurality of sensitive attributes; and computer readable program code that is configured to query the (k,e)-anonymous permutation of the database that includes the plurality of sensitive attributes in response to a user query and to output a result of the user query of the (k,e)-anonymous permutation of the database that includes the plurality of sensitive attributes to the user;

wherein the computer readable program code that is configured to partition the plurality of tuples into groups comprises computer readable program code that is configured to find a minimum size axis-parallel square that covers projections of the at least two of the plurality of sensitive attributes in a respective group; and wherein the computer readable program code that is configured to find a minimum size axis-parallel square that covers projections of the at least two of the plurality of sensitive attributes in a respective group comprises computer readable program code that is configured to compute centered axis-parallel squares and computer readable program code that is configured to compute axis-parallel squares anchored to a grid from the centered axis-parallel squares.

2. A computer program product according to claim 1 wherein the computer readable program code that is configured to partition the plurality of tuples into groups comprises computer readable program code that is configured to sequentially and non-iteratively process a next sequential tuples in the database to determine whether to perform one of including the next sequential tuple into an existing group of the database and beginning a new group of the database, based on a smallest cost increase.

3. A computer program product for anonymizing a database that includes a plurality of tuples, a respective one of the plurality of tuples including a quasi-identifier and a sensitive attribute associated with the respective one of the plurality of tuples, the computer program product comprising a non-transitory computer readable storage medium having computer readable program code embodied in the non-transitory computer readable storage medium, the computer readable program code comprising:

computer readable program code that is configured to obtain a sorted database having the plurality of tuples that are sorted by the sensitive attribute;

computer readable program code that is configured to sequentially and non-iteratively process a next sequential tuple in the sorted database to determine whether to perform one of including the next sequential tuple into an existing group of the sorted database and beginning a new group of the sorted database, based on a smallest cost increase as determined by at least one of a minimum sum-of-error calculation, a minimum max-of-error calculation and a greedy algorithm, so as to partition the plurality of tuples that are sorted by the sensitive attribute into groups, a respective group including at least k different values of the sensitive attribute, where k is at least two, and a corresponding range of the sensitive attribute that is at least e, where e is greater than zero, to provide a (k,e)-anonymized database; and computer readable program code that is configured to query the (k,e)-anonymized database in response to a user query and to output a result of the user query of the (k,e)-anonymized database to the user.

4. A computer program product according to claim 3 wherein the computer readable program code that is configured to sequentially and non-iteratively process a next sequential tuple in the sorted database to determine whether to perform one of including the next sequential tuple into an existing group of the sorted database and beginning a new group of the sorted database, scales on an order of a number of tuples in the plurality of tuples.

5. A computer program product according to claim 3 wherein the computer readable program code that is configured to obtain a sorted database having the plurality of tuples that are sorted by the sensitive attribute, comprises:

computer readable program code that is configured to obtain the database that includes the plurality of tuples, a respective tuple including a quasi-identifier and a sensitive attribute associated therewith; and computer readable program code that is configured to sort the database by the sensitive attribute.

* * * * *